USOO5091849A

United States Patent [19]

Davis et al.

[11] Patent Number: 5,091,849
[45] Date of Patent: Feb. 25, 1992

[54] COMPUTER IMAGE PRODUCTION SYSTEM UTILIZING FIRST AND SECOND NETWORKS FOR SEPARATELY TRANSFERRING CONTROL INFORMATION AND DIGITAL IMAGE DATA

[75] Inventors: Lemuel L. Davis; Mark R. Kimball, both of La Canada; Vahe Sarkissian, Pasadena; Dylan Kohler, Glendale, all of Calif.

[73] Assignee: The Walt Disney Company, Burbank, Calif.

[21] Appl. No.: 636,544

[22] Filed: Jan. 2, 1991

Related U.S. Application Data

[63] Continuation of Ser. No. 263,429, Oct. 24, 1988, abandoned.

[51] Int. Cl.$^5$ .................... G26F 13/42; G26F 15/62
[52] U.S. Cl. ................... 395/100; 364/222.2; 364/227.1; 364/228.3; 364/242; 364/237.2; 364/916.5; 364/919.2; 364/920.7; 364/427.2; 364/DIG. 1; 364/DIG. 2
[58] Field of Search ... 364/200 MS File, 900 MS File, 364/518, 521

[56] References Cited

U.S. PATENT DOCUMENTS

3,747,087  7/1973  Harrison, III et al. ............. 340/703
3,767,901  10/1973  Black et al. .......................... 364/518

(List continued on next page.)

FOREIGN PATENT DOCUMENTS

1888828  7/1986  European Pat. Off. .
WO8705767  9/1987  PCT Int'l Appl. .

OTHER PUBLICATIONS

Mark Levoy, Thesis, "Computer-Assisted Cartoon Animation", Cornell University (Aug., 1978).
"Yabba-Dabba-Dec!", Digital Review (Sep. 15, 1986) pp. 57–60.
Dan Cody, "An Antimated Topic", Sky (Jan. 1987), pp. 10–15.
John Lewell, "Behind the Screen at Hanna-Barbera", Computer Pictures (Mar./Apr. 1985), pp. 15–20, 43.

Ronald Clarke, "Film-Makers Drawing on a ?10M Computer", Scotsman (Sep. 18, 1985) p. 15.
Judson Rosebush, "Computer Animation in the U.K.", Computer Graphics World (Jul. 1984) pp. 14–18.
Jonathan B. Tucker, "Computer Graphics Achieves New Realism", High Technology (Jun. 1984), pp. 40–53.
David Collins, "Opus-One Electronic Intermediate Production Suite an Available Reality", Image Technology (Apr. 1987), pp. 136–137.
Kellog S. Booth et al., "Computers Animate Films and Video", IEEE Spectrum (Feb. 1983), pp. 44–51.
Yu, et al., "Enhancing a Local Area Network for Internetworking", *Proceedings of the 12th Conference on Local Computer Networks* (Oct. 5, 1987), pp. 66–71.

Primary Examiner—Thomas C. Lee
Assistant Examiner—Ayni Mohemed
Attorney, Agent, or Firm—Irell & Manella

[57] ABSTRACT

A computer image production system (2) for processing digital image data is disclosed. The computer animation production system (2) contains at least one information processing device (44–76) for enabling at least one user to develop, utilize and enhance digital image data. The information processing device (44–76) is associated with a first (4) and a second (6, 8, 10, 12 and 14) global area network (4). The first global area network (4) is for communicating digital control information to at least one information processing device. The digital control information includes image database information. The second global area network (6, 8, 10, 12 and 14) is for communicating the digital image data to the at least one information processing device (44–76). The digital image data includes pixel characteristic information for image reproduction on the information processing device. The second global area network (6, 8, 12 and 14) also includes a means for arbitrating (36, 38, 40, 42 or 43) access of the digital image data to the information processing device (44–76). Associated with the means for arbitrating is a temporary memory means (28, 30, 32, 34 or 35) for storing the digital image data likely to be accessed by the information processing device (44–76). A relational database management system (23) maintains the digital control information for production scheduling and tracking purposes.

45 Claims, 17 Drawing Sheets

U.S. PATENT DOCUMENTS

| | | | |
|---|---|---|---|
| 3,833,757 | 9/1974 | Kirk, Jr. et al. | 358/86 |
| 3,919,640 | 11/1975 | Simciak | 375/42 |
| 3,949,171 | 4/1976 | Painter | 370/19 |
| 4,189,743 | 2/1980 | Schure et al. | 358/93 |
| 4,189,744 | 2/1980 | Stern | 358/93 |
| 4,197,590 | 4/1980 | Sukonick et al. | 364/900 |
| 4,402,073 | 8/1983 | Hammond | 370/9 |
| 4,424,572 | 1/1984 | Lorig et al. | 364/900 |
| 4,439,760 | 3/1984 | Fleming | 340/799 |
| 4,449,218 | 5/1984 | Strehl | 370/69.1 |
| 4,503,499 | 3/1985 | Mason et al. | 364/200 |
| 4,528,642 | 7/1985 | Waller | 364/900 |
| 4,549,219 | 10/1985 | Sne et al. | 358/405 |
| 4,558,413 | 12/1985 | Schmidt et al. | 364/300 |
| 4,587,651 | 5/1986 | Nelson et al. | 370/88 |
| 4,600,919 | 7/1986 | Stern | 340/725 |
| 4,633,430 | 12/1986 | Cooper | 364/900 |
| 4,680,821 | 10/1988 | Crossley | 364/200 |
| 4,689,683 | 8/1987 | Efron | 358/185 |
| 4,731,784 | 3/1988 | Keller et al. | 370/85.5 X |
| 4,754,395 | 6/1988 | Weisshaar et al. | 364/200 |
| 4,792,945 | 12/1988 | Mark | 370/85.5 |
| 4,809,170 | 2/1989 | Liblang et al. | 364/200 |
| 4,817,050 | 3/1989 | Komatsu et al. | 364/900 |

TYPICAL WORKSTATION

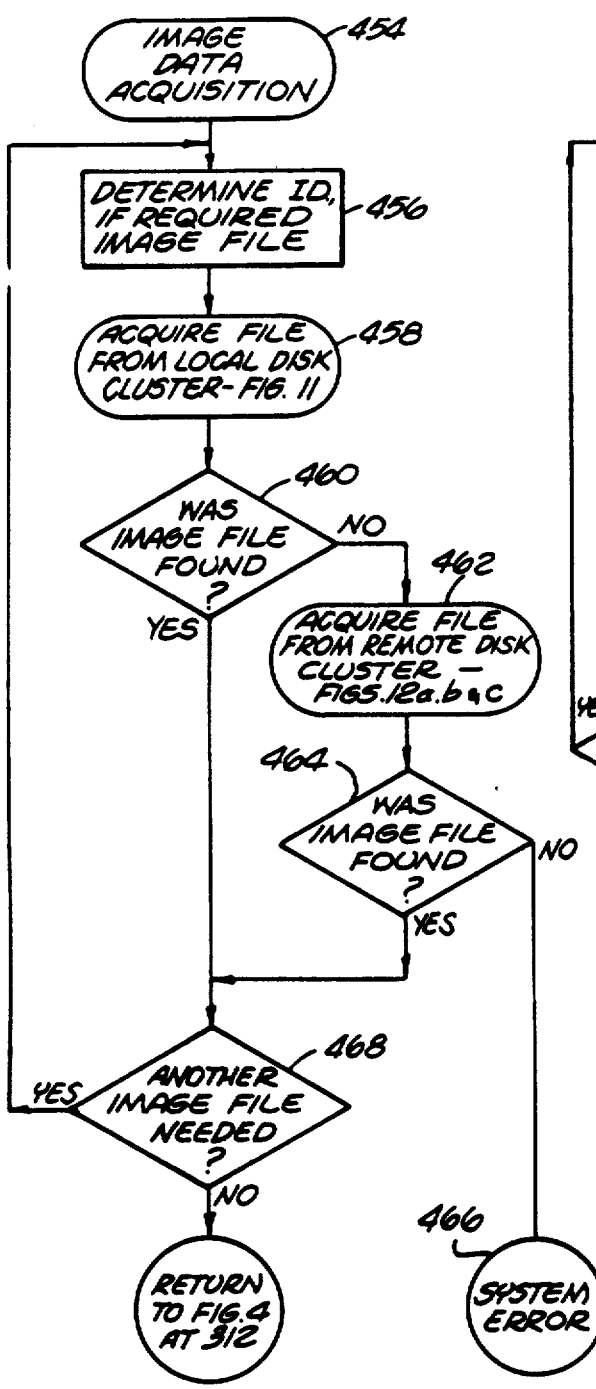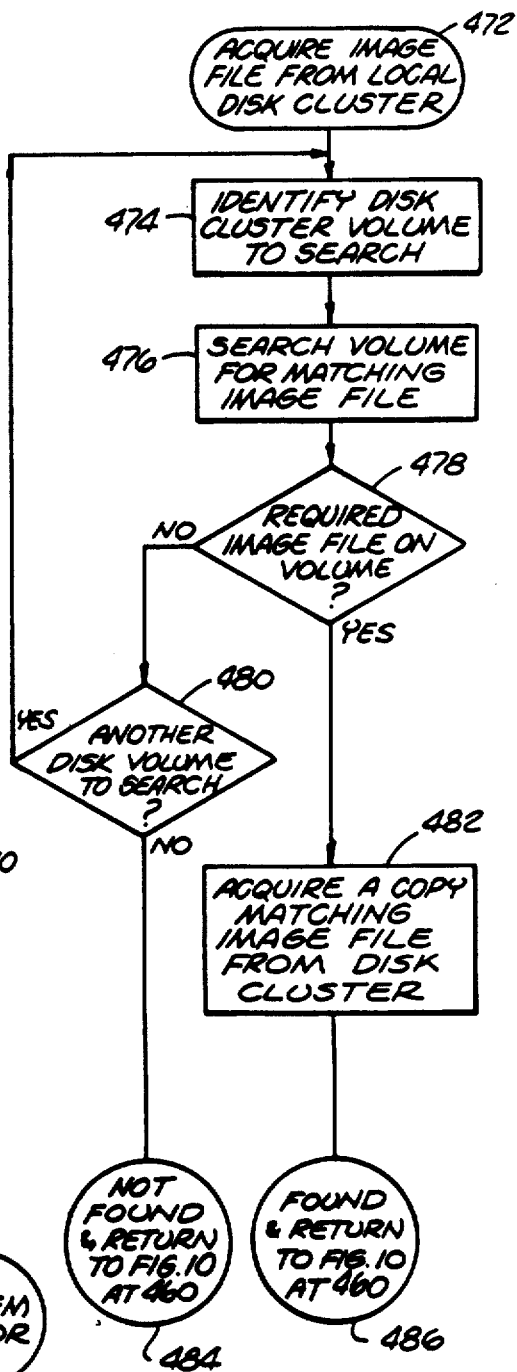

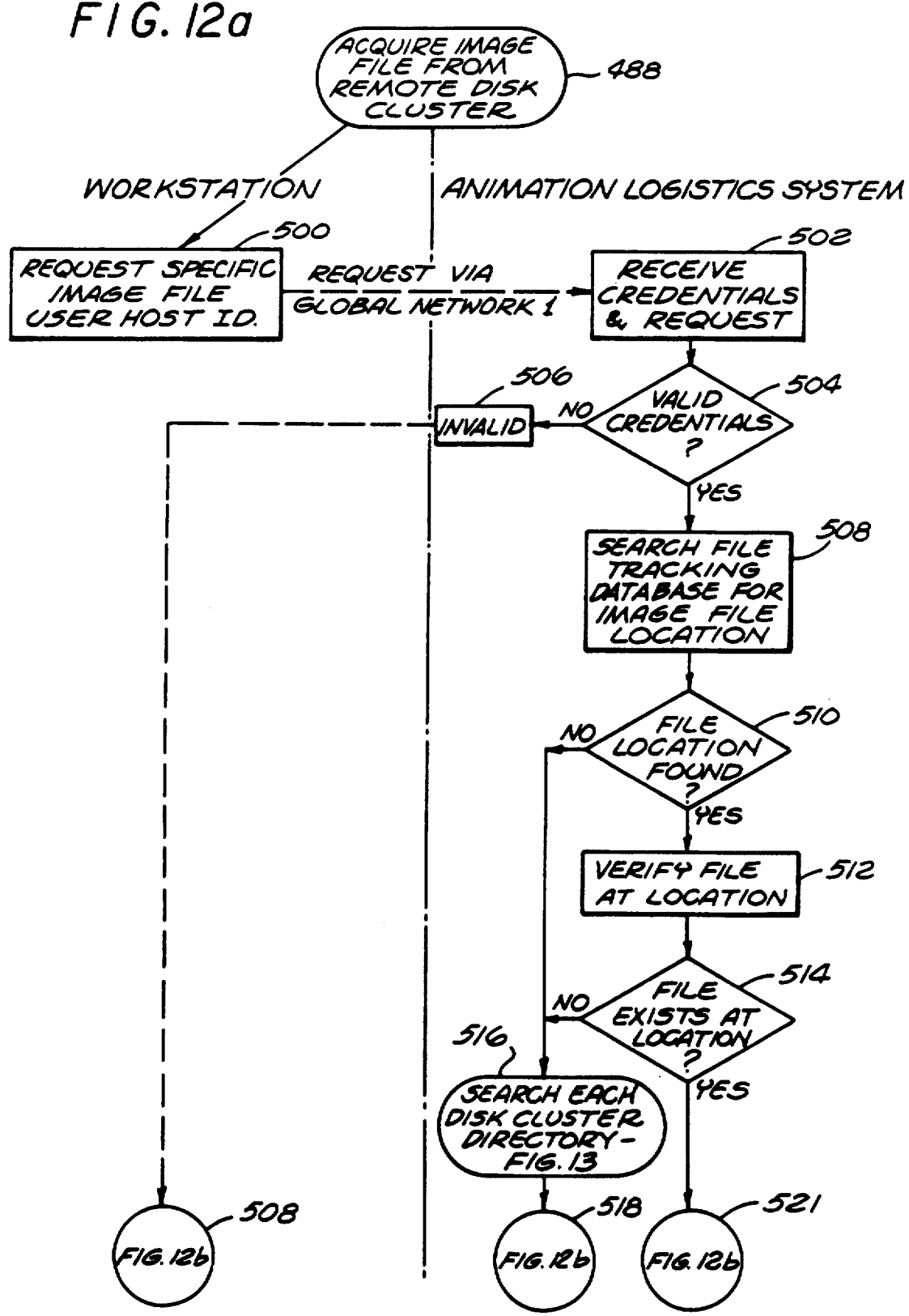

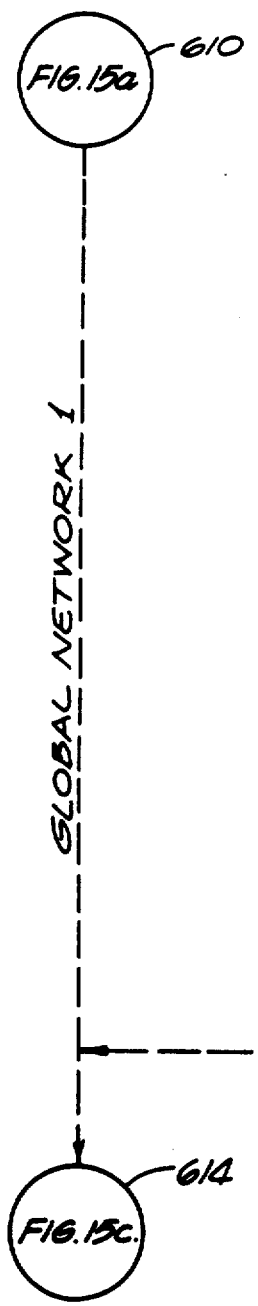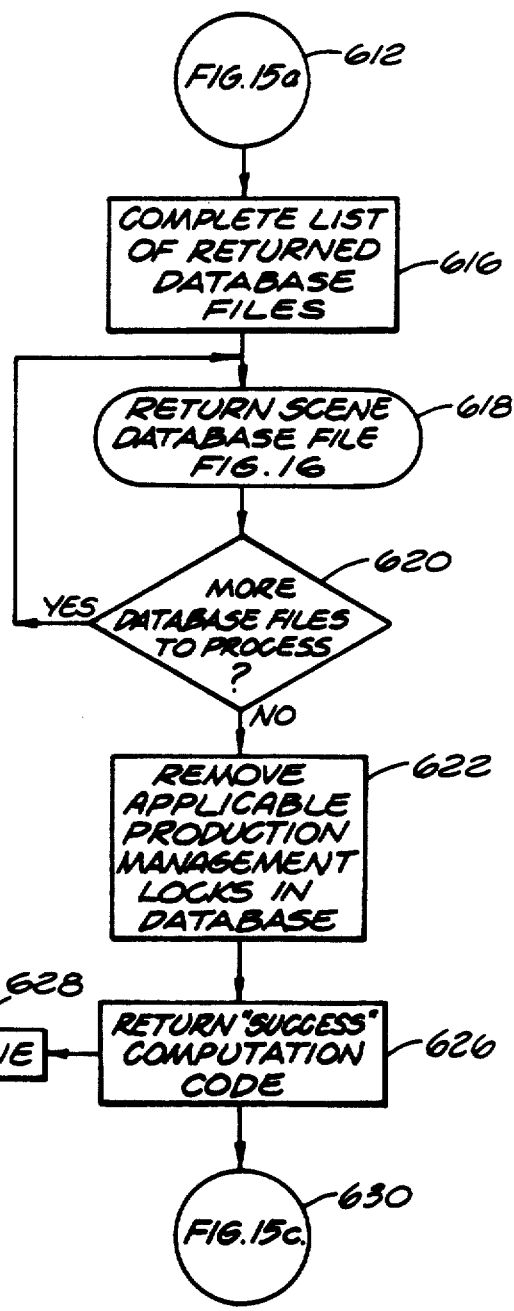
FIG. 15b

COMPUTER IMAGE PRODUCTION SYSTEM UTILIZING FIRST AND SECOND NETWORKS FOR SEPARATELY TRANSFERRING CONTROL INFORMATION AND DIGITAL IMAGE DATA

RELATED APPLICATIONS

The present application is a continuation application of a patent application having Ser. No. 07/263,429, filed Oct. 24, 1988 and which has been expressly abandoned. The present application incorporates herein by reference patent application having Ser. No. 07/263,429, priority of which is claimed.

FIELD OF THE INVENTION

The present invention relates to a computer animation production system for processing digital image data to at least one information processing device (workstation) for enabling users to develop, utilize and enhance feature-film animation More particularly, the computer animation production system includes a first global area network and a second global area network; the first global area network communicates digital control information to the at least one information processing device and the second network separately communicates digital image data to the at least one information processing device

BACKGROUND OF THE INVENTION

The production of feature-film animation is a lengthy and complicated task, sometimes requiring the resources of an entire studio for a period ranging from one to three years after a script has been completed. Animation for feature-films is generally of the highest quality involving several cell layers, extensive background work, and careful attention to production details such as cell cleanliness, image detail and accuracy.

Due to the intensive and costly labor requirements associated with animation, numerous steps have been taken to integrate computers into the process of generating feature-film animation. There are substantial advantages to be gained by utilizing digital techniques in the preparation of cartoon backgrounds and characters. For instance, painting with a computer graphics system is a rapid, easy process which allows a great leeway for editing and correction. Additionally, optical scanning can be used to automatically input completed characters and background paintings. For example, after a particular background has been stored in the system, color palettes can be altered, allowing the artist's painting to suffice for two different backgrounds; one as a night scene and the other as a day scene. Several computer graphic methods currently exist for converting animator's pencil sketches into full color images. The computed colored sketches (cells) can be easily combined with foreground and background layers to produce completed frames In addition to offering considerable savings in labor, these methods provide editing and correction capabilities which were previously not implementable by conventional animation techniques, Mark Levoy, "COMPUTER-ASSISTED CARTOON ANIMATION"—Masters Thesis, Cornell University (August, 1978).

In the past several years, many innovations have occurred, enabling systems to accommodate the intensive computational and storage requirements associated with computerized animation. For example, in an article entitled "YABBA DABBA DEC," Digital Review (Sept. 15, 1986), a system is described for handling the image data requirements for television production purposes. The article describes a supercomputer-central-processing system consisting of a VAX cluster arrangement incorporating two VAX-11/785s, a VAX 8650, a HSC50 mass storage controller with twelve RA81 disk drives and two RA78 magnetic tape drives.

Although the system described may be acceptable for television image data requirements, it is inadequate for the enormous data requirements associated with feature-film animation. Due to the extremely high data requirements associated with recording on high resolution films (feature film animation is typically recorded on 35 mm film), the centralized processing strategy quickly becomes a bottleneck for storing, updating and transferring digital image data. Under such circumstances, the production efficiency for creating computerized feature-film animation is substantially degraded.

SUMMARY OF THE INVENTION

The present invention provides a method and apparatus for maximizing the overall efficiency of storing, updating and transferring digital image data for the purpose of increasing the efficiency of feature-film animation production.

Briefly, the preferred embodiment of the invention is a computerized information processing apparatus which contains a first global area network and a second global area network. The first global area network communicates digital control information to at least one information processing device (workstation). The digital control information includes database information. The second global area network is for communicating digital image data to the at least one information processing device. The digital image data includes pixel characteristic information for image reproduction on the at least one information processing device. The second global area network also includes at least one means for arbitrating access (parallel disk controller) of the digital image data for the at least one information processing device. Associated with each of the at least one means for arbitrating is a temporary memory means (disk cluster) for storing digital image data likely to be accessed by the at least one information processing device.

In the preferred embodiment, the second global area network also contains an archival memory means for storing digital image data and associated database information (Animation Logistics System) for longer periods of time. The archival memory means typically includes an optical disk configuration or high capacity tape drive(s).

The preferred embodiment also includes a preferred method for use with the computer animation production system for processing digital image data. The method includes three steps. First, requesting a segment of digital image data and associated database information for further processing at one of the information processing devices; second, determining the location of the segment of digital image data; and third, transferring the requested segment of digital image data over the second global area network to the requesting information processing device for further processing, only when the requested segment of digital image data is not presently controlled by the requesting information processing device.

The architecture and methodology of the present invention reduce the cost of producing animation in the classical animation style, by using information processing devices to assist in the animation process. The information processing devices essentially distribute the processing power from a central location, as discussed in YABBA DABBA DEC, to dispersed locations along the first and the second networks. In this way, the intensive data requirements of a centralized system are distributed among several information processing devices simultaneously.

The architectural design and methodology of the present invention maximize the throughput of digital image data and control information by utilizing two independent global area networks, while minimizing the potential downtime caused by any system malfunction by distributing the processing power to the information processing devices. A sophisticated data base management system (Animation Logistics System) also enhances efficiency by keeping track of all memory storage allocation and production scheduling; supervisors of the production process are kept informed at all times of the status of any task being performed at the dispersed information processing devices. Lastly, the architectural design is such that expansion is easily accommodated.

BRIEF DESCRIPTION OF THE DRAWINGS

FIG. 10 is a flow diagram which depicts the sequence of operations of the Animation Logistics System for determining the location of a requested digital image data file under control of the IMAGE DATA ACQUISITION routine referenced in FIG. 4;

FIG. 11 is a flow diagram which depicts the sequence of operations of the workstation for determining the location of a requested digital image data file at a local disk cluster under control of the ACQUIRE IMAGE FILE FROM LOCAL DISK CLUSTER routine referenced in FIG. 10;

FIGS. 12a, 12b and 12c are flow diagrams which depict a sequence of operations of the Animation Logistics System for determining the location of a requested digital image data file at a remote disk cluster under control of the ACQUIRE IMAGE DATA FILE FROM REMOTE DISK CLUSTER routine referenced in FIG. 10;

FIG. 13 is a flow diagram which depicts the sequence of operations of the Animation Logistics System for searching each volume directory of a cluster in order to locate a requested digital image data file under control of the SEARCH EACH CLUSTER VOLUME DIRECTORY routine referenced in FIG. 12a;

FIGS. 15a, 15b and 15c are flow block diagrams which depict the sequence of operations of a workstation (FIG. 3) and the Animation Logistics System for releasing control of scene database files and image data files under control of the ACCESS RELEASE routine referenced in FIG. 4;

DETAILED DESCRIPTION OF THE INVENTION

TABLE OF CONTENTS

Figure 16:
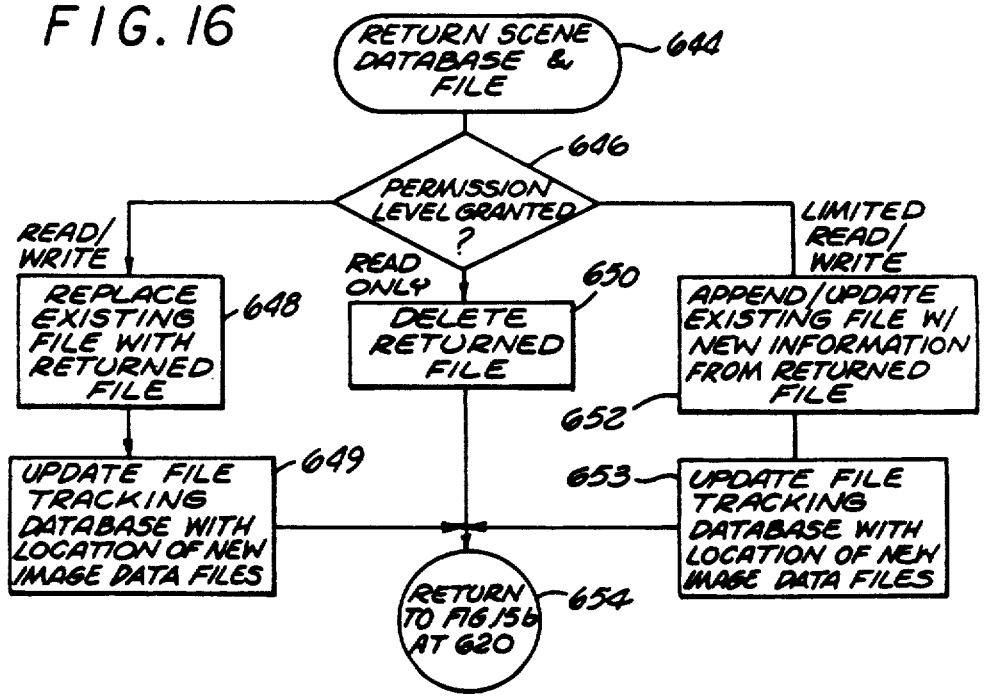
FIG. 16 is a flow diagram which depicts the sequence of operations of the Animation Logistics System for storing or deleting returned scene database files and DATABASE FILE routine referenced in FIG. 15b.
Figure 17:
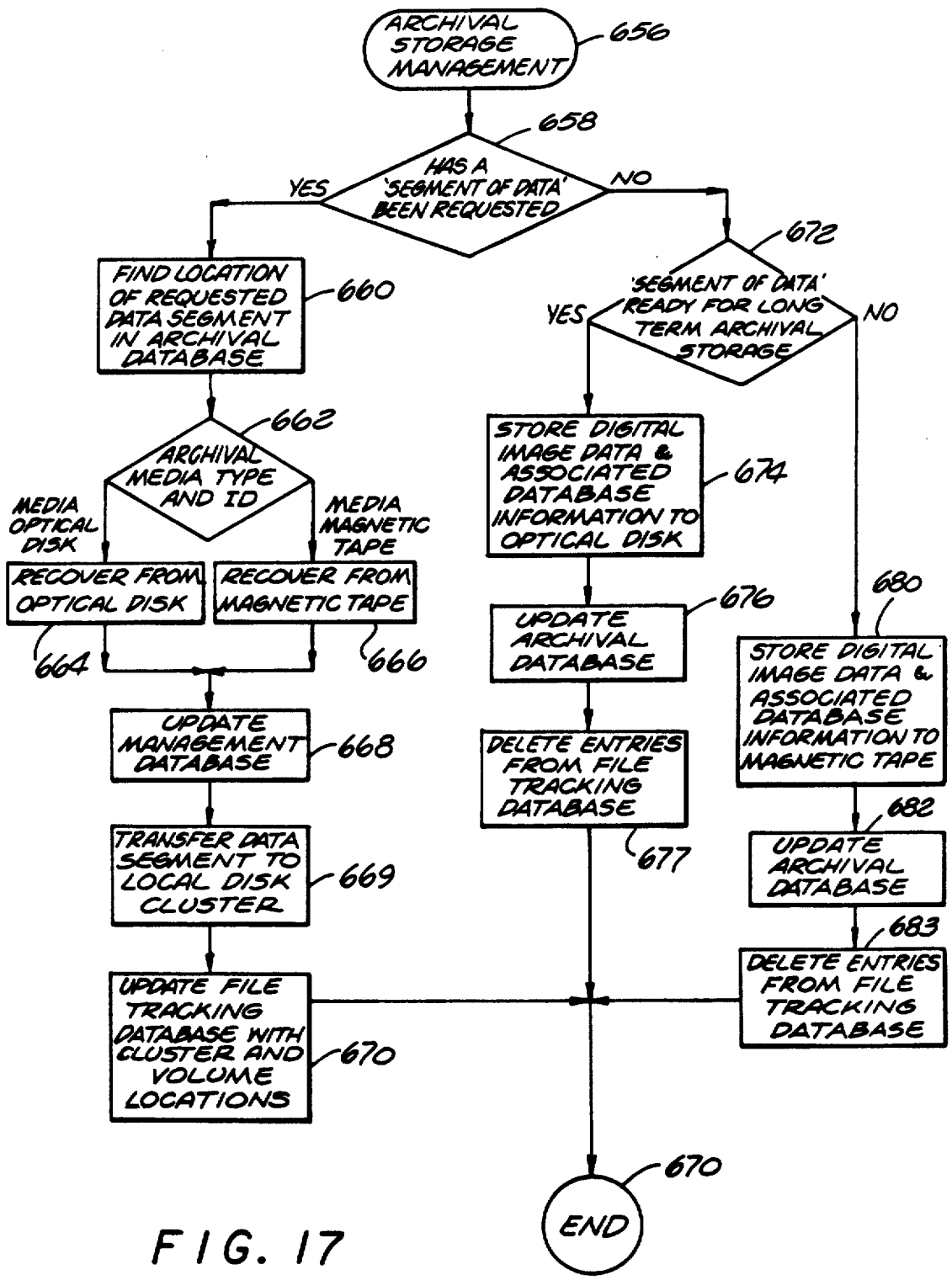
FIG. 17 is a flow diagram which depicts the sequence of operations of the Animation Logistics System for retrieving and updating scene database files and image data files from and to the archival storage memory under control of the ARCHIVAL STORAGE MANAGEMENT routine.

I. Architecture Overview (FIGS. 1 and 2)
II. Workstations (FIG. 3)
III. Animation Logistics System (FIGS. 1 and 2)
IV. Methods of Acquiring and Returning Both Scene Database Files and Image Data Files
   a) USER INTERACTION Routine (FIG. 4)
   b) WORK SELECTION Routine (FIG. 5)
   c) WORKLIST ACQUISITION Routine (FIGS. 6a and 6b)
   d) WORK SELECTION DATABASE QUERY Routine (FIG. 7)
   e) ACCESS ARBITRATION Routine (FIGS. 8a and 8b)

f) SCENE DATABASE ACQUISITION Routine (FIG. 9)
g) IMAGE DATA ACQUISITION Routine (FIG. 10)
h) ACQUIRE IMAGE FILE FROM LOCAL DISK CLUSTER Routine (FIG. 11)
i) ACQUIRE IMAGE DATA FILE FROM REMOTE DISK CLUSTER Routine (FIGS. 12a, 12b and 12c)
j) SEARCH EACH CLUSTER VOLUME DIRECTORY Routine (FIG. 13)
k) DATA ENHANCEMENT Routine (FIG. 14)
l) ACCESS RELEASE Routine (FIGS. 15a, 15b and 15c)
m) RETURN SCENE DATABASE FILE Routine (FIG. 16)
n) ARCHIVAL STORAGE MANAGEMENT Routine (FIG. 17)

I. Architecture Overview (FIGS. 1 and 2)

Figure 1:
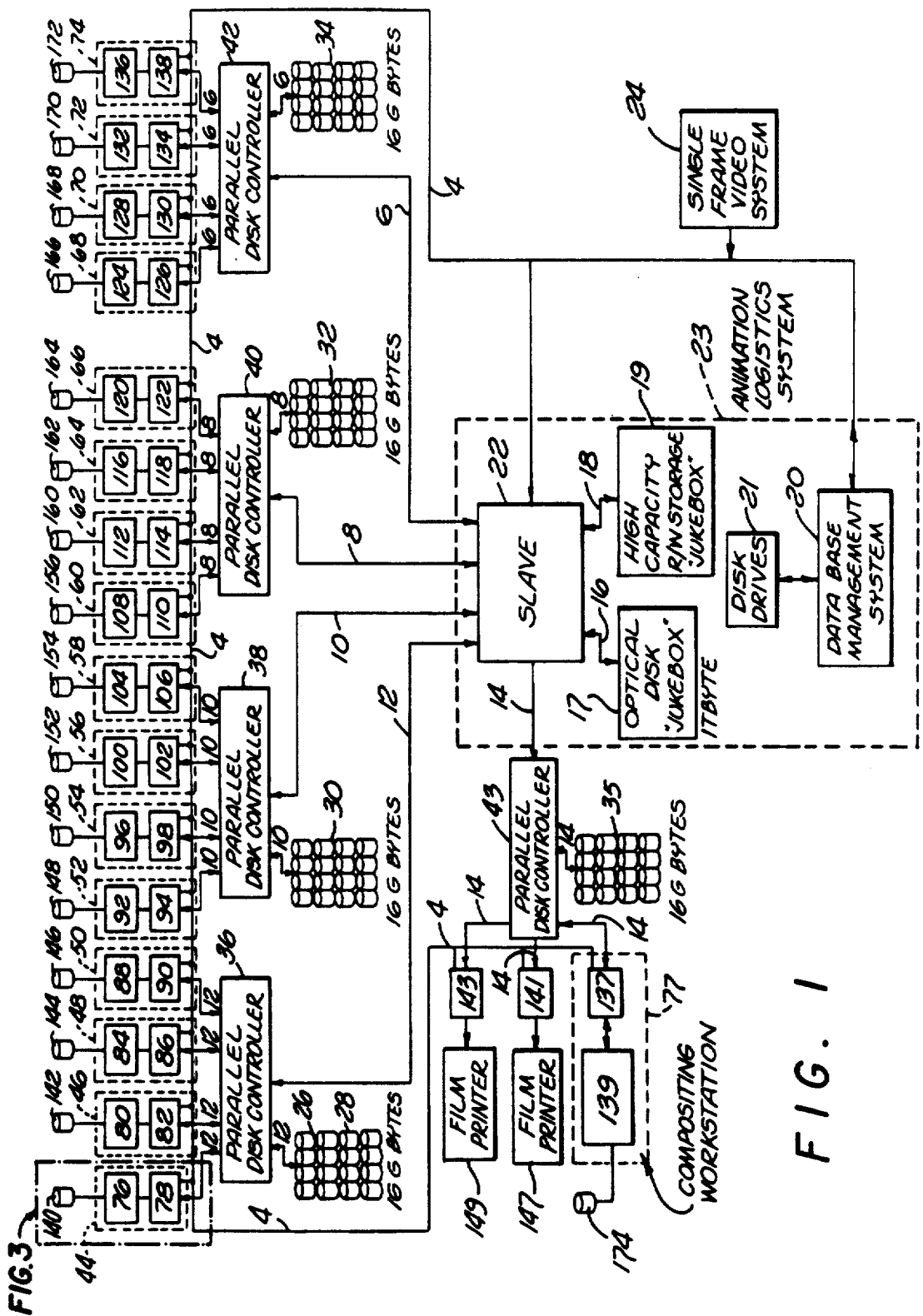
FIG. 1 is a schematic block diagram of a computer animation production system for storing, updating and transferring digital image data in accordance with the present invention.
Figure 2:
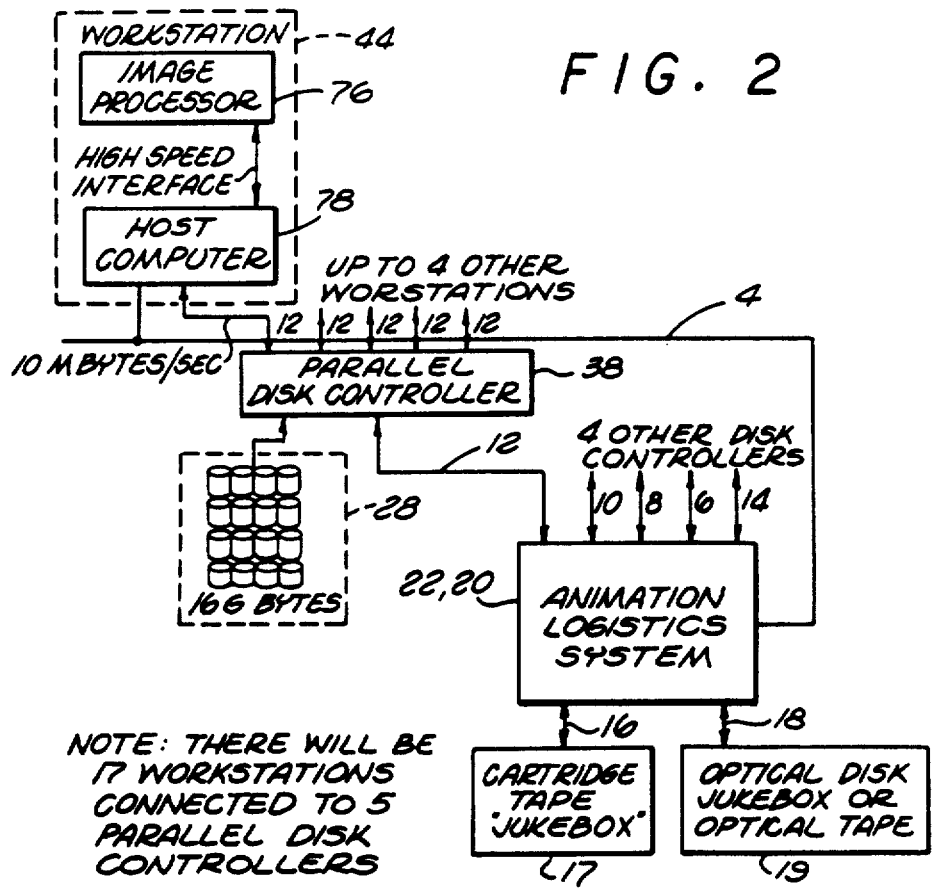
FIG. 2 is an alternate embodiment of the computer animation production system for processing digital image data in accordance with the present invention.

FIG. 1 depicts a schematic block diagram of a computer information processing device 2 (or computer animation production system) for processing digital image data. The computer animation production system 2 consists of two global area networks. In the preferred embodiment, the first global area network 4 communicates digital control information to seventeen information processing devices (workstations) 44, 46, 48, 50, 52, 54, 56, 58, 60, 62, 64, 66, 68, 70, 72, 74 and 76 (44–76). Control information includes database information managed by a Database Management System 20 within Animation Logistics System 23 which is dedicated to both the first and second global area networks (4, 6, 8, 10, 12 and 14).

The database of the Animation Logistics System 23 is a relational database stored on magnetic disk drive(s) 21. The Animation Logistics System 23 improves overall system efficiency by coordinating the production work at the distributed workstations 44–76 and providing control information to the workstations 44–76. Specifically, the Animation Logistics System 23 in the preferred embodiment performs the following functions:

1) production scheduling,
2) production tracking and report generation,
3) scene database management,
4) digital image database management, and
5) storage allocation.

A more detailed discussion regarding each of these tasks will be presented in Section III (infra). The Animation Logistics System 23 is the "backbone" of the computer animation production system 2 since it provides control over an enormous amount of digital image data and database information.

The second global area network provides a series of high speed buses 6, 8, 10, 12 and 14 for the transfer of digital image data to and from workstations 44–76. In the preferred embodiment, the second global area network 6, 8, 10, 12 and 14 links together to a series of storage units 17, 19, 28, 30, 32, 34, and 35 which together maintain approximately 1.25 million mega bytes of data. The storage units consist of optical disk 17, high capacity tape drive 19, and disk cluster locations 28, 30, 32, 34 and 35. The Animation Logistics System 23 keeps track of the storage allocation on each of these storage units.

The Animation Logistics Systems 23 includes Slave 22 for performing archival storage operations for the optical disk or "jukebox" 17 and high capacity tape drive(s) or "jukebox" 19, both for storing large amounts of digital image data for long periods of time. More particularly, the high capacity tape drive(s) 19 is used for backups (i.e. in case of power loss, loss of equipment or human error) and for access of digital image data not currently stored on the disk clusters 28, 30, 32, 34 and 35. Tape drive(s) 19 is also used as a secondary data storage device for files that are not currently accessed as often as those files presently on the disk clusters 28–30, 32, 34 and 35. In the preferred embodiment, storage requirements for tape drive(s) 19 are in the range of several hundred gigabytes to a terabyte of data. Typically, the files on tape drive(s) 19 consist of a mix of ASCII files and compressed binary image data files.

Optical disk(s) 17 also involves a high volume of archival image data storage. In the preferred embodiment, optical disk(s) 17 is a write-once disk system which maintains finished scenes for future reference. The files stored on the optical disk also consist of a mix of ASCII files and compressed binary data files, with similar storage data requirements as the tape drive system 19.

Both forms of archival storage (i.e. tape drive(s) 19 and optical disk(s) 17 perform an extremely valuable function in preserving the finished animation film product against loss or damage. The Animation Logistics System 23 is responsible for archiving all of the information needed to make finished products as well as maintaining a record of the location of all of the image data stored on either form of archival storage. (See Section III).

Each high speed bus 6, 8, 10, 12 and 14 of the second global area network is coupled to a parallel disk controller 42, 40, 38, 36 and 43 which acts as a local area network coordinating access to each of the disk clusters 28, 30, 32, 34 or 35. Each disk cluster 28, 30, 32, 34 and 35 preferably consists of 16 disk drives having a total storage capacity of 16 gigabytes of digital image data. The preferred embodiment of the parallel disk controller is a "Strategy 1 TM" disk controller sold by Maximum Strategy, Inc., 160 East Virginia Street, San Jose, California 95112, and a user's manual entitled "Strategy 1—File Access Controller" is herein incorporated by reference.

In the preferred embodiment, parallel disk controllers 42, 40, 88, 36 and 43 are capable of transferring data at a rate of up to four times the speed of a normal disk controller, by reading and writing to four of the sixteen disks of a particular cluster in parallel. Since the data transfers are very efficient and do not take long to complete, up to five workstations can operationally share a single parallel disk controller and its associated disk cluster. The disk space available in a cluster provides an abundance of disk capacity for the associated workstations. It is envisioned that the disk clusters will be utilized for scenes that are currently being accessed or those scenes anticipated to be accessed. More particularly, the scenes that are anticipated to be accessed are prefetched and stored on the appropriate clusters in anticipation of a particular workstation needing to access the digital image data. This strategy substantially reduces the number of inter-clustered transfers required. Preferably, the parallel disk controller enables the associated workstations to communicate in terms of logical blocks rather than physical disk parameters such as cylinders, tracks and sectors. This strategy relieves the user and the workstation of the burden of dealing with lower level access details including logical to physical block mapping, block management and data error recovery.

Whenever data is transferred from the archival memory devices 17 or 19 to a particular workstation, the image data is sent to the parallel disk controller associated with the requesting workstation and stored in the local disk cluster first. The parallel disk controller creates a copy of the digital image data and sends it to the requesting workstation. Other workstations connected to the parallel disk controller may have access to the requested digital image data after the requesting workstation has completed its present task. A more detailed description on this process is presented in Sections IV(g), IV(h), and IV(i).

Single frame video system 24 inputs artwork (i.e., backgrounds and character sketches) into the computer animation production system 2 by scanning the artwork and converting it into digital image data. The digital image data is sent by the first global area network 4 to a digitizing camera check workstation where a user cleans up the digitized images if necessary, etc. (See Section II).

Referring to FIG. 2, an alternate architecture for the computer animation production system 2 of FIG. 1 is depicted. Workstation 44, a parallel disk controller 38, and disk cluster 28 are shown connected to high speed bus 12 of the second global area network. By this arrangement, the coordination of archival storage 22 of digital image data and the digital control database 20 are merged into one super-computer labeled Animation Logistics System 22, 20. Both the first 4 and second 12 global area networks are connected to the Animation Logistics System 22, 20. The operation of the Animation Logistics System 22, 20 is precisely the same as the Animation Logistics System 23 (FIG. 1) discussed above, however, only one computer system instead of two performs both the archival storage operations and database control functions. Additionally, optical disk 19 and cartridge tape 17 are both attached to Animation Logistics System 22, 20 for storing both digital image data and control database information. For a more detailed discussion on the Animation Logistics System (FIGS. 1 and 2) see Section III.

Figure 3:
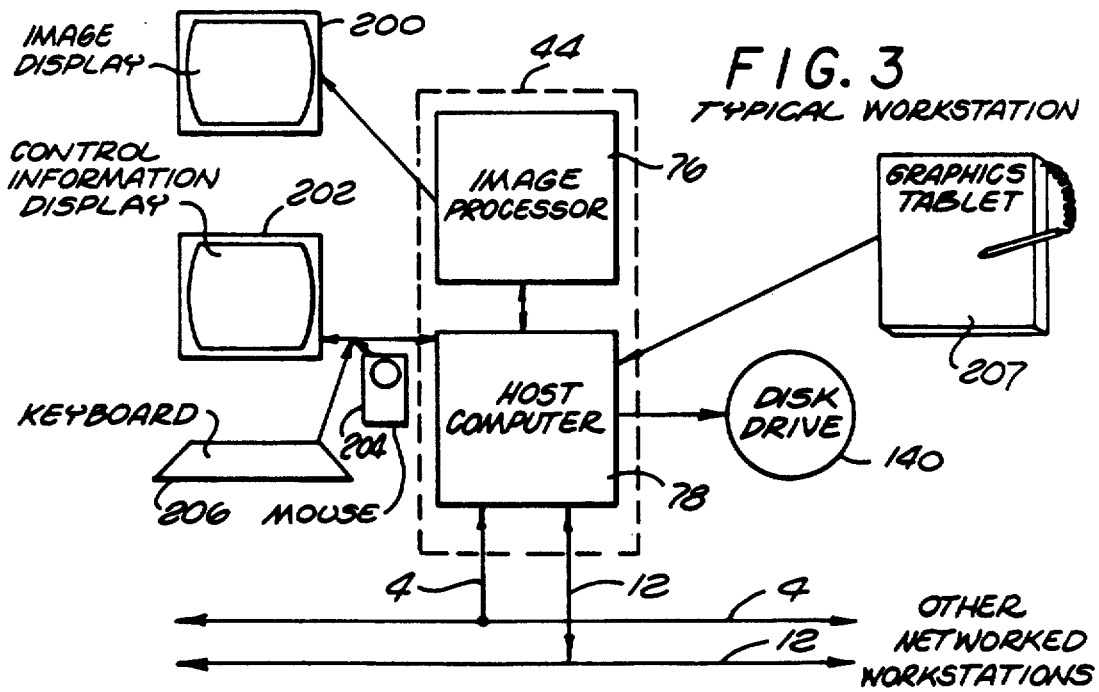
FIG. 3 depicts a schematic block diagram of a workstation at which a user can review and update the digital image data and associated databases respectively, in accordance with the present invention.

II. Workstations (FIG. 3)

A more detailed discussion of the preferred embodiment of a workstation is now presented. In the preferred embodiment, each of the 17 workstations (44-76) comprise the same components as the workstation to be described and as shown in FIG. 3. Referring to FIG. 3, workstation 44 is coupled to both the first 4 and second 12 global area networks. The first global area network 4 communicates digital control information to workstation 44, and the second global area network 12 separately communicates digital image data to workstation 44. Workstation 44 consists of an image processor 76 and a host computer 78. Attached to image processor 76 is an image display 200 for displaying artwork and completed animation. Coupled to host computer 78 is control information display 202, keyboard 206 and mouse 204. Also coupled to the host computer 78 is a disk drive 140 for retaining operating system software (preferably a Unix operating system), local application software and database information received from the database 20 of the Animation Logistics System 23. Mouse 204, keyboard 206, and graphics tablet 203 enable a user at the workstation to communicate with host computer 78 by manipulating information on the control information display 202. Updating exposure-sheets, requests for digital image data, etc., are made by keyboard 206, mouse 204 or graphics tablet 203.

In the preferred embodiment, image processor 76 is a Pixar Image Computer by Pixar Inc., San Rafael, Calif. 94913, which is designed to accommodate pixel digital image data. Four color pixels are stored as four 12-bit quantities, one for red, green, blue and alpha "channels" of a picture. Together, these four channels define the color (RGB) and transparencies (alpha) of any particular pixel location in memory. The images are stored on the local disk cluster 28, 30, 32, 34 or 35.

In the preferred embodiment, the host computer 78 is either a Sun Series 3, Silicon Graphics Iris 3100 series or a Dec micro VAXII/Ultrix system. The host computer coordinates all communications with the first and second global area networks 4 and 12, all interfacing with the user via keyboard 206, mouse 204, graphic tablet 203, and at disk drive 140.

Each workstation is capable of performing any of the following tasks:
1) digitizing camera checking,
2) cells coloring,
3) image compositing,
4) scene planning,
5) background painting,
6) color modeling, and
7) layout design.

As discussed earlier, the digitizing camera check workstation capability enables the user to correct digitized images by correcting color edges, etc. More particularly, areas not fully enclosed within lines are closed. Smudges are removed and cleaned-up frames are sent via one of the second global area network's high speed buses 6, 8, 10, 12 or 14 to a local disk cluster 28, 30, 32, 34 or 35. Character sketches are assumed to be black and white line drawings, pencil or ink, on standard animation paper. Backgrounds are assumed to be standard color background paintings, generally designed for scanning. Those skilled in the art are readily familiar with the various types of apparatus and techniques for digitizing and scanning artwork.

The cells coloring capability of the workstation enables a user to change the color of lines and fill in areas with arbitrary colors selected from a customized palette. The history of fills and touchups to each frame is saved in order to automatically repaint the artwork at a later time should the colors be redesigned.

The image compositing capability of the workstation enables the system to wipe, pan, truck, cross dissolve and fade. Additionally, filters for focusing, fogging, diffusion, and tinting can also be applied. This capability is driven by an exposure sheet (see Section III) which is generated by the scene planning capability of the workstation. More particularly, the scene planning capability enables the user to construct and update exposure sheets. Additionally, multiplaning can be implemented with controls for smooth interpolation of resizing, rotation, shearing and translation on individual levels.

The background painting capability of the workstation is designed for enabling the user to pan large backgrounds and paint desired areas. This capability includes painting brushes of different sizes and shapes, transparency, different styles of painting (including "airbrush," smear and blur), screens, lines, area clears and fills, palette control, picture storage and retrieval, cut and paste, magnification and cursor control.

The color modeling capability of the workstation enables a user to design palettes for use in the cells coloring and background painting capabilities. Individual colors can be mixed from the primaries (red, green and blue) or from the perpetual parameters (hue, saturation, and value). Palettes are designed by assigning desired colors to the desired locations in the palette. This capability enables the painter to capture desired colors as if he were painting with real oils. Layout capability enables the user to plan action: movement of characters over backgrounds, camera pans and zooms.

It is envisioned that each workstation will have several other capabilities, but for purposes of explaining the present invention, these capabilities need not be discussed. In sum, each workstation acts as a mini-production house with all of the capabilities of a traditional studio and more. In this way, the processing power of the computer animation production system 2 is dispersed along the first and second global area networks at workstations 44-76.

III. Animation Logistics System (FIGS. 1 and 2)

Due to the relative importance of the Animation Logistics System 23 (FIG. 1), a more detailed discussion of the pertinent functions and database content of the Animation Logistics System 23 is now presented. Recall that the Animation Logistics System 23 forms the "backbone" of the computer animation production system 2 for efficiently coordinating and controlling the entire production of feature-film animation. Earlier, a partial list of specific functions of the Animation Logistics System 23 was presented:

1) production scheduling,
2) production tracking and report generation,
3) scene database management,
4) digital image database management, and
5) storage handling.

The production scheduling capability of Animation Logistics System 23 includes all of the functions that interactively allow an administrator or supervisory person to establish or change the production priorities in the computer animation production system 2. The Animation Logistics System 23 maintains a separate Production Management Database which maintains all information needed to produce management reports detailing the exact production status on each scene and on the production as a whole. The following is a partial listing of the information maintained for each scene:

1) production number,
2) sequence number,
3) scene number,
4) number of frames,
5) lock status (i.e. read-write or limited read-write),
6) location status,
7) completion status (i.e. 20-30 tracking completion dates),
8) access frequency data, and
9) draft (i.e. script information).

Preferably, the information is structured in a table format in the form of a relational database. For a more detailed discussion regarding the structure and operation of relational databases, refer to C.J. Date, "An Introduction to Database Systems," Vol. 1, 4th Edition, Addison-Wesley (1986), which is herein incorporated by reference. The relational database enables users to perform powerful relational operations to retrieve and manipulate data in the Production Management Database. For example, a "SELECT" operation can be performed to retrieve progress information on all scenes associated with a particular production. In this way, status information on the production can be retrieved and a report on the progress of each scene can be generated.

For each entry or row in the Production Management Database, none, one or more entries are maintained on a File Tracking Database also maintained by the Animation Logistics System 23. The File Tracking Database provides the location of digital image data for each scene stored on disk cluster locations 28, 30, 32, 34 or 35. Each disk cluster is preferably separated into four volumes and each volume has a separate cluster volume directory associated with it. The File Tracking Database maintains the cluster and volume location for each image data file on the system. Normally, to perform a search of a particular cluster for a given scene, up to four accesses to the cluster directories would be necessary to locate the given scene. Whereas, the File Tracking Database would only require one access to locate the requested scene. The File Tracking Database and the Production Management Database together keep track of the location of image data, along with the status of each scene in the system (e.g., whether it has been digitized, colored, cut into a story reel, etc.). As stated earlier, this information can be delivered to the supervisory personnel in the form of a printed report.

Each entry on the Production Management Database corresponds to one or more scene databases which contains all of the information related to a scenes' organization and its informational content. Specifically, the scene database contains all the information required to access any of the files associated with a particular scene including exposure sheets, binding lists, scene composite databases and tests. Exposure sheets contain the bulk of information regarding a single scene: items such as fielding, timing, motion, special effects, cell order, etc. They are organized in the scene database reflecting the structure of the production, that is, they are retrieved by the production, sequence and scene numbers.

The binding list denotes the specific artwork version associated with each artwork designator listed in the exposure sheet. For example, there may be three different versions of a particular piece of artwork for the character, "Basil." The binding list designates which version of "Basil" should be retrieved when the actual digital image data is obtained from memory storage (i.e. disk cluster, archival storage, etc.). A separate database called the scene composite database links the appropriate binding list to an exposure sheet so that the proper version of the characters, etc., is shown in the appropriate order and sequence.

A "test" is a "dry run" of a scene (a trial of the animation) which is established by merging the exposure sheet and binding list together. The result of the test is saved in storage in the form of a composite digital image data file.

The Animation Logistics System 23 also maintains an Archival Production Management Database (Archival Database) in the form of a relational database. The Archival Database keeps track of all files which are stored on optical disk 17 or high capacity tape drive 19 for temporary or long-term storage. A partial listing of the information stored in the Archival Database is the following:

1) production number,
2) sequence number,
3) scene number, 4) length,
5) storage media type,
6) storage media ID name, and
7) storage media location.

Items 5, 6, and 7 constitute the name and location of stored digital image data in either archival memory device 17 or 19. As the actual image data is stored on the archival memory devices 17 and 19, the Animation Logistics System 23 updates the Archival Database to insure that the archived files are properly tracked.

Animation Logistics System 23 also maintains a Worklist Database in the form of a relational database for providing production workflow. The production of an animated feature can be thought of as a pipeline, where the work to be performed generally proceeds from one area to another in a fixed sequence. The order is not always rigid, however; often a scene will have to be returned to a previous stage to be redone. The worklist provides an organization for which the users are provided work assignments for particular scenes, etc. The database for a partial list of the information stored in the worklist includes:

1) production number,
2) sequence number,
3) scene number,
4) scene footage,
5) scene status, and
6) redo flags and comments, etc.

Relational operations (i.e. SELECT operations, etc.) can be performed to retrieve worklist information regarding desired scenes of particular productions. To prevent concurrency situations, a locking mechanism will prevent more than one user from simultaneously trying to update the same worklist. (See Sections IV(b) and IV(c).)

When a particular user at a workstation requests a scene database file, the Animation Logistics System 23 allows the files to be accessed in one of three ways:

1) read-write status,
2) read-only status, and
3) limited read-write status.

In a multi-user system (in the preferred embodiment, 17 users could work simultaneously at the 17 workstations (44-76)) where more than one user can obtain a copy of a scene (i.e. digital image data and related databases inform) and make changes to it (read-write), there is a danger that information will be lost. This problem can be eliminated if only one user is given permission to change the file at any one time. The Production Management Database (discussed above) maintains a list of the available scenes and their associated files and whether any user has a cop of a scene checked out to their workstation with the intention of making changes to it (lock status). By only allowing one user to have "read-write" permission to the scene, the Animation Logistics System 23 can protect the integrity of the production data. If a workstation has a "read-write" lock on the file and another workstation requests the file "read-write", the requestor will be denied access (scene is locked) to the scene and an indication of the reason for denial as well as the identification of the workstation/user of that scene will be returned. For a more detailed discussion, see Section V(e). With this information, the operator of the requesting workstation may make inquiries via telephone or otherwise about the expected schedule of use of the requested scene.

It is envisioned that a user may wish to acquire a scene database file and the related image data files without affecting the contents of the files. For example, the user may wish to perform a test, look at frames, or perform other operations which do not affect the contents of the file. In these situations, "read-only" permission status is made available which enables a user to obtain a particular scene database file without being able to alter or add to the contents of the file. Essentially, a copy of the file is made available to the requesting user and this copy is not allowed to be returned to storage. The Animation Logistics System 23 does not track the number or location of the "read-only" copy because it will not alter the contents of the original file; it will eventually be deleted. For a more detailed discussion, see Section IV(m).

In other circumstances, it is envisioned that the work for a particular scene will be divided among several users of different workstations simultaneously (e.g., digitizing, camera, background, etc.). In these situations, a special set of rules is devised to allow the workstations to share the scene database file. The method envisioned enables each user to have a particular portion of the scene database file with "read-write" permission status to affect only their own particular portion of the scene file. This arrangement is known as "limited read-write" permission status. Upon completion of the assignment by each workstation, the updated portions of the scene database file and image data files will be returned and merged with one another to form newly updated scene database and image data files. For a more detailed discussion, see Section IV(m).

Figures 4, 5:
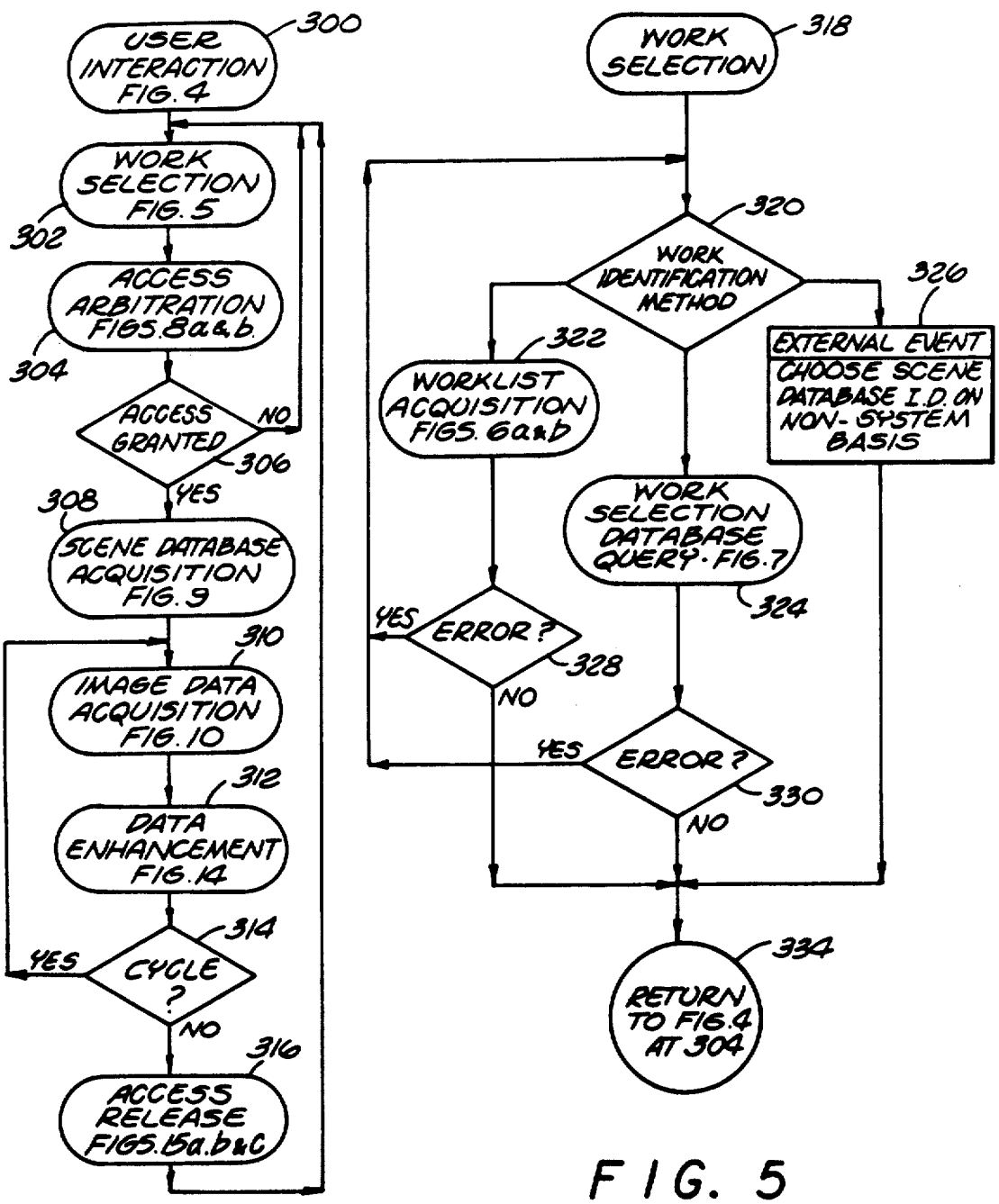
FIG. 4 is flow diagram which depicts the sequence of operations of the computer animation production system of FIGS. 1 and 2 under control of the USER INTERACTION routine for acquiring, using and returning both image files and scene database files.
FIG. 5 is a flow diagram which depicts the sequence of operations performed by various components of the computer animation production system of FIGS. 1 and 2 for determining the identification of a requested scene under control of the WORK SELECTION routine referenced in FIG. 4.

IV. Methods of Acquiring and Returning Both Scene Database Files and Image Data Files Referring to FIGS. 4, 5, 6a, 6b, 7, 8a, 8b, 9, 10, 11, 12a, 12b, 12c, 13, 14, 15a, 15b, 15c, 16 and 17, a detailed discussion presenting the methodology of acquiring, using, and returning both image data files and scene database files is now presented.

a) USER INTERACTION Routine (FIG. 4)

Referring to FIG. 4, a flow diagram entitled USER INTERACTION is shown for detailing the overall sequence of operations necessary for retrieving and returning scene database files and image data files. The oval shaped blocks depict subroutine calls which are more fully depicted in accompanying Figures. Referring to block 302 of FIG. 4, the routine WORK SELECTION (FIG. 5) (see Section IV(b)) is called to determine the production, sequence, and scene numbers (or identification) associated with a particular scene the user wishes to work on. During block 304, the ACCESS ARBITRATION routine (FIGS. 8a and 8b) (see Section IV(e)) is called to determine whether anyone else on the computer animation production system 2 currently has access to the requested scene. The ACCESS ARBITRATION routine (FIGS. 8a and 8b) (see Section IV(e)) determines the accessibility of a requested file by evaluating the permission status level of the requesting user and the requested file and returns either an "access granted" or "access not available" message. Processing continues to block 306 during which a determination is made on whether access to the requested scene has been granted. Assuming that access to the requested scene is not granted, processing continues to block 302, during which the user has the opportunity to select a new scene by obtaining different identification; the process starts over. Assuming that access is granted at blocks 304 and 306, processing continues to block 308, during which the routine SCENE DATABASE ACQUISITION (FIG. 9) (see Section IV(f)) is called.

The scene database, as stated earlier, contains all of the information about a particular scene including the computer exposure sheets, binding lists, scene version lists, tests, etc. (see Section III). The SCENE DATABASE ACQUISITION routine (FIG. 9) determines the location of the scene database file, obtains a copy of the file, and moves it to the local disk drive 140, 142, 144, 146, 148, 150, 152, 154, 156, 158, 160 ... 174 associated with the requesting workstation 44–76. Once the scene database file has been obtained, the digital image data associated with the scene database is retrieved by the routine IMAGE DATA ACQUISITION (FIG. 10) (see Section IV(g)) at block 310. The IMAGE DATA ACQUISITION routine (FIG. 10) locates the digital image data file associated with the scene database file and, if needed, moves the image data to the disk cluster 28, 30, 32, 34 or 35 associated with the requesting workstation 44–76. When the digital image data resides at the local disk cluster, a copy of the image data file is made and sent to the requesting workstation. The user can make enhancements to the image data at his workstation during the DATA ENHANCEMENT routine (FIG. 14) (see Section IV(k)) during block 312.

During block 314, a determination on whether the user needs to acquire additional image data files for enhancement purposes is made. If the user wishes to continue, then processing continues at blocks 310, 312 and 314 until the user specifies that he/she is finished obtaining and updating image data. Assuming that the user does not wish to continue "cycling", processing continues at block 316, during which the ACCESS RELEASE routine (FIGS. 15a, 15b, and 15c) (see Section IV(c)) is called.

The purpose of the ACCESS RELEASE routine (FIGS. 15a, 15b and 15c) is for releasing access and returning both the scene database and the image data files which have been currently opened. Once the scene database and image database files have been released and returned, processing continues to block 302. During block 302, the user has the opportunity to restart the entire process of acquiring, using, and returning scene database files and related image data files. If the user does not wish to continue, the process simply halts and waits for the next command by the user.

b) WORK SELECTION Routine (FIG. 5)

Referring to FIG. 5, a more detailed discussion of the WORK SELECTION routine (FIG. 5) is now presented. At block 320, a determination is made on which one of three different methods should be performed to obtain the identification of a requested scene database file. Assuming that the user wishes to obtain the identification from the worklist, processing continues at block 322, during which the WORKLIST ACQUISITION routine (FIGS. 6a and 6b) (see Section IV(c)) is called. Recall that the worklist contains a list of assignments previously set up by the user's supervisor to inform him on what tasks to perform and on which scenes. The worklist also provides the identification associated with the requested scenes (see Section III). At block 328, a determination on whether an error occurred during the WORKLIST ACQUISITION routine (FIGS. 6a and 6b) is made. Assuming that no error occurred during the routine, processing continues at block 334, during which processing returns to the USER INTERACTION routine (FIG. 4) at block 304.

Returning to block 328, if an error did occur during the WORKLIST ACQUISITION routine (FIGS. 6a and 6b) (i.e. no worklist associated with the particular user), then processing continues at block 320. At this time, the user would have the opportunity of selecting a different identification method for determining the identification. Assume that the user knows that the scene he is supposed to work has a particular background or cells image which is associated with, for example, a rainstorm. The user can perform a query operation on the Production Management Database to obtain all scenes related to rainstorms. During block 324, the WORK SELECTION DATABASE QUERY routine (FIG. 7) (see Section IV(d)) is called to perform the appropriate relational database operation to perform the query. During block 330, a determination on whether any error occurred during the WORK SELECTION DATABASE QUERY routine (FIG. 7) is made. Assuming that no error occurred, processing continues at block 334, during which processing returns to the USER INTERACTION routine (FIG. 4) at block 304. Returning to block 330, if an error did occur during the WORK SELECTION DATABASE QUERY routine (FIG. 7), processing would return to block 320.

Figures 6A, 6B:
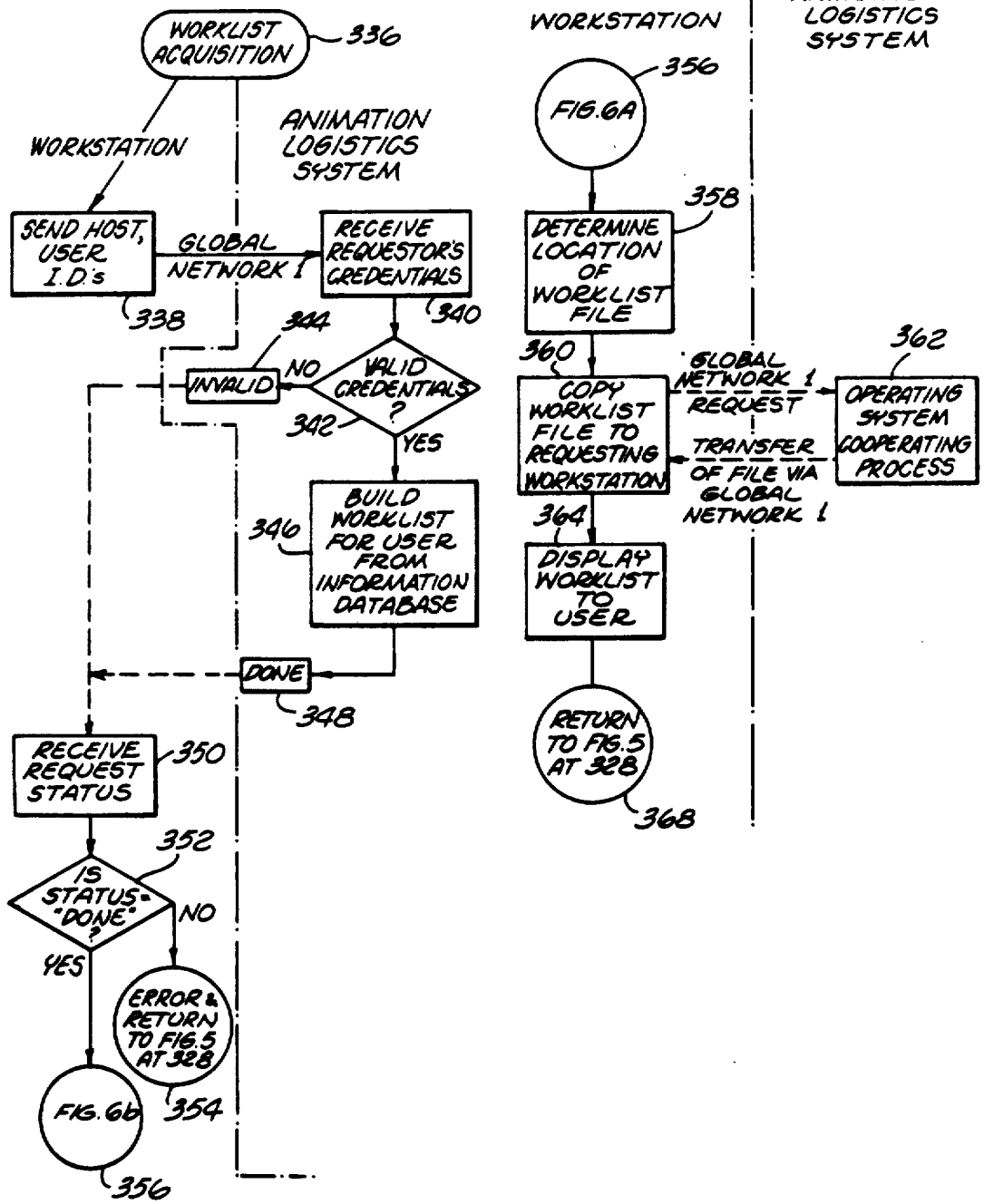
FIGS. 6a and 6b are flow diagrams which depict the sequence of operations of a workstation (FIG. 3) and the Animation Logistics System for locating and acquiring a copy of a worklist under control of the WORKLIST ACQUISITION routine referenced in FIG. 5.

Assuming that there is no worklist associated with the user and that the user does not have enough information to perform a query on the Production Management Database, then the only way the user can obtain a scene database file is if he enters directly the production, sequence, and scene numbers. Typically, this occurs when a supervisor specifically instructs a user to obtain a particular scene and provides the identification information to the user external to the computer animation production system 2. During block 326, the external event occurs during which the user on a non-system basis obtains the identification for a particular scene database file. Processing continues at block 334, during which processing returns to the USER INTERACTION routine (FIG. 4) at block 304.

c) WORKLIST ACQUISITION Routine (FIGS. 6a and 6b)

Referring to FIGS. 6a and 6b, a detailed discussion of the WORKLIST ACQUISITION routine referenced in the WORK SELECTION routine (FIG. 5) at block 322 is now presented. To illustrate the division of processing occurring at one of the workstations 44–76, and at the Animation Logistics System 23, FIGS. 6a and 6b are separated into two portions. The left-hand side of the flow chart depicts processing at the requesting workstation, and the right-hand side of the flow chart shows processing at the Animation Logistics System 23. Lines in between both sides show flow of communications over the first or second global area networks. Dotted lines mean that the particular path shown is optional pending the outcome of a particular block.

During block 338 (FIG. 6a), the user at the requesting workstation sends a worklist request along with the host computer's and user's identification. At block 340, the requestor's credentials are received by the Animation Logistics System 23. During block 342, the Animation Logistics System 23 determines whether the host and user's identification are valid. If, for example, the user is not an authorized user of the system, then processing continues at block 344, during which a "invalid" message is sent back to the workstation over the first global area network 4 (FIGS. 1 and 3). At block 350, the "invalid" message is received by the workstation 44-76. Assuming that the requestor's credentials are valid, processing continues at block 346 during which a worklist is built for the requesting user. Then during block 348, a "done" message is returned to the requesting workstation. At block 350, the "done" message is received by the workstation, and during block 352 the workstation determines if the status returned by the Animation Logistics System 23 is "done." If the status returned was an "invalid" message, processing returns with an error message to the WORK SELECTION routine (FIG. 5) at block 328. An error message is returned because something unusual has occurred—the user's credentials are invalid.

Figure 7:
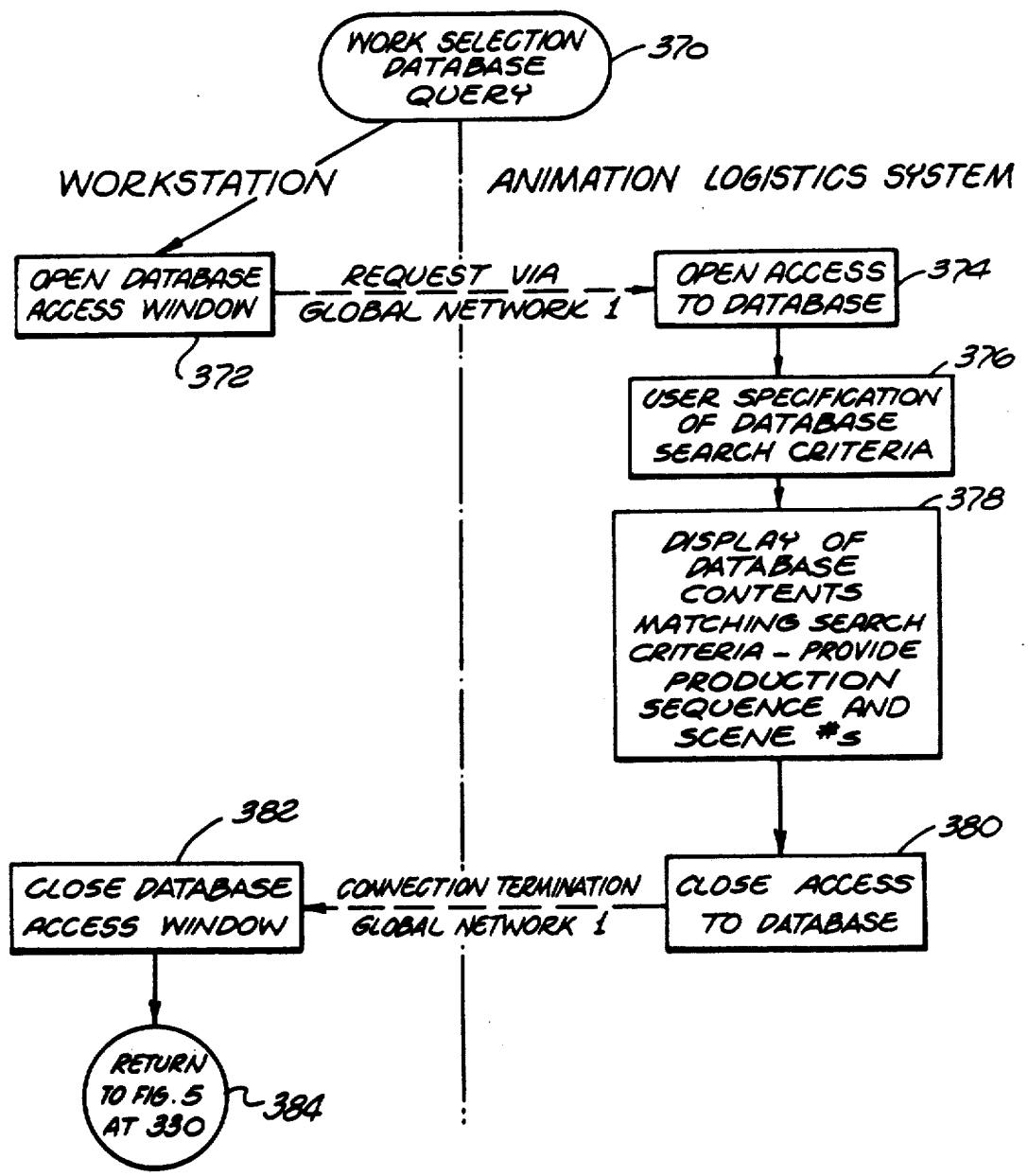
FIG. 7 is a flow diagram which depicts the sequence of operations of a workstation (FIG. 3) and the Animation Logistics System for performing a relational database query to determine the identification for a particular scene under control of the WORK SELECTION DATABASE QUERY routine referenced in FIG. 5.
Figure 8A:
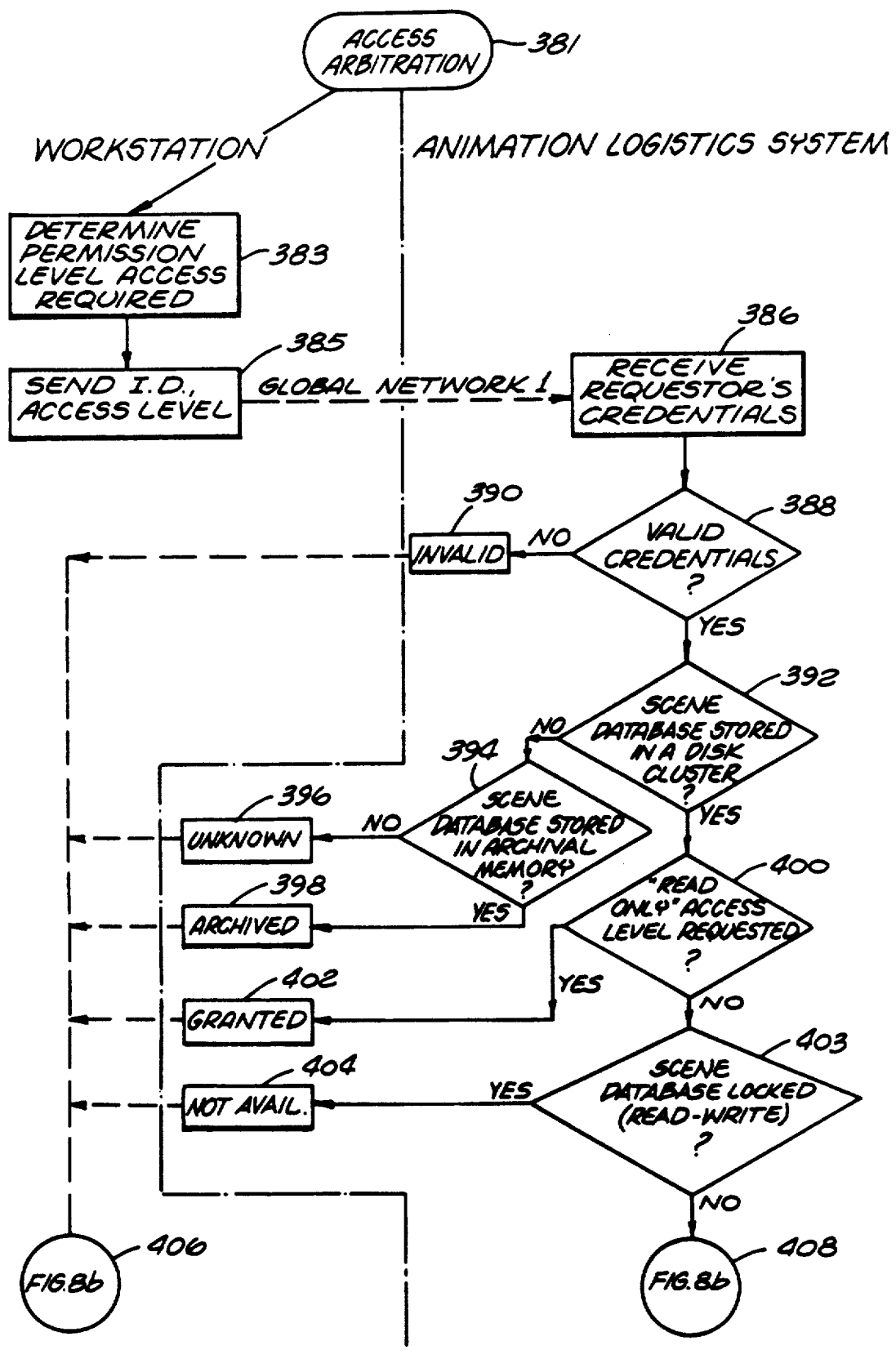
FIGS. 8a and 8b are flow diagrams which depict the sequence of operations of a workstation (FIG. 3) and the Animation Logistics System for determining the accessibility of a requested scene under control of the ACCESS ARBITRATION routine referenced in FIG. 4.
Figure 8B:
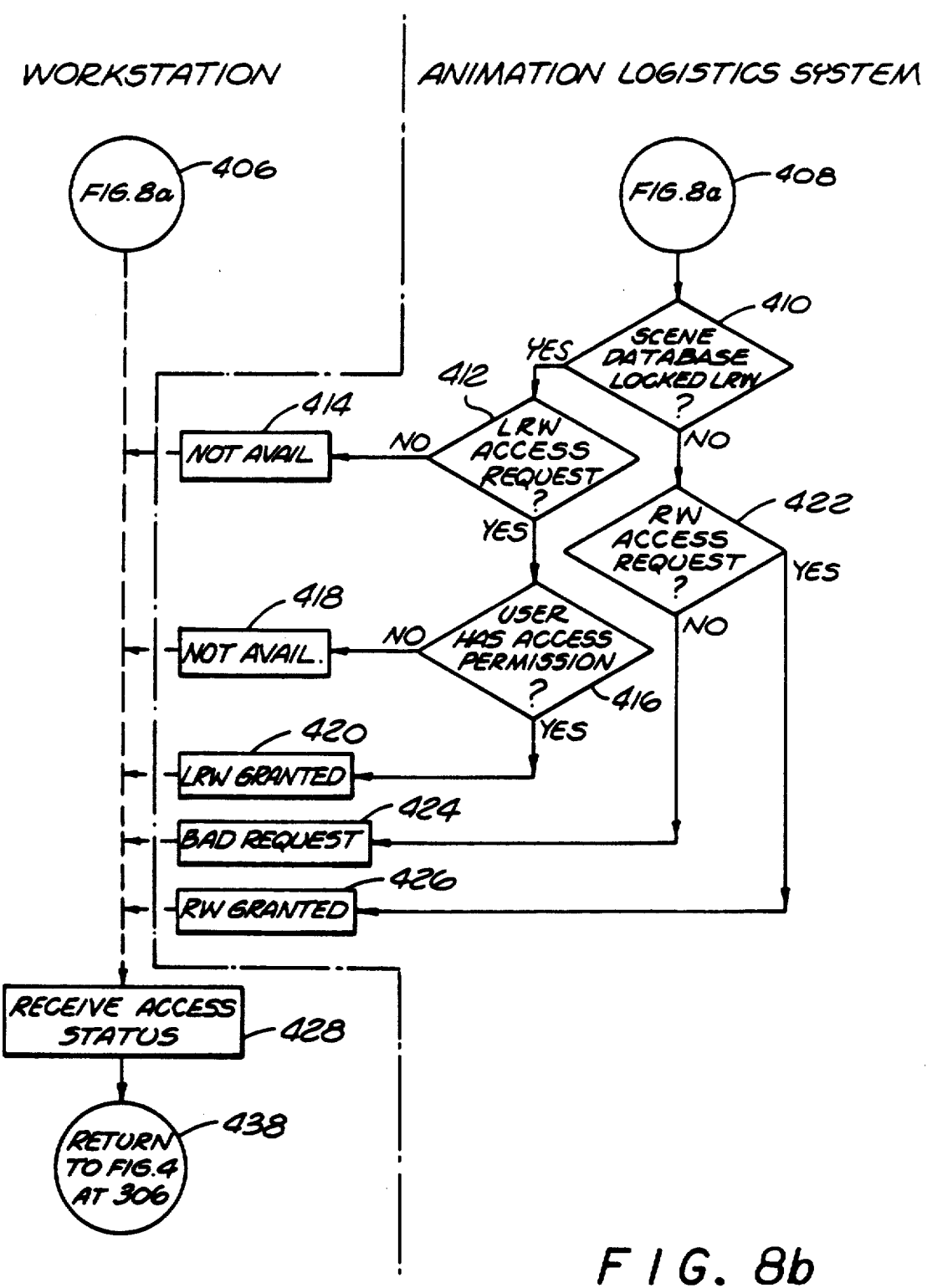

Assuming that at block 352 the status determined is "done," processing continues to block 356 and to FIG. 6b at block 358. During block 358, the location of the worklist file associated with the requesting user is determined. At block 360 (FIG. 6b), a worklist is copied by the requesting workstation and sent to the local disk drive associated with the work station. This step incorporates block 362 during which the operating system of the Animation Logistics System 23 coordinates processing over the first global area network 4 to transfer the worklist file to the requesting workstation. At block 364, the retrieved worklist is displayed to the user at the workstation. Lastly, during block 368, processing returns to the WORK SELECTION routine (FIG. 5) at block 328.

d) WORK SELECTION DATABASE QUERY Routine (FIG. 7)

Referring to FIG. 7, a more detailed discussion of the WORK SELECTION DATABASE QUERY routine referenced during the WORK SELECTION routine (FIG. 5) at block 324 is now presented. At block 372, the user presents his query in the form, for example, of an SQL "SELECT" operation at the requesting workstation. This step effectively opens access to the Production Management Database or any of the other databases located on the system. The request is sent via the first global area network 4 and at block 374 the Animation Logistics System 23 receives the query. During block 374, the specified relational operation is performed according to the user's search criteria. During block 378, the results of the search are assembled into a table which provides the production, sequence, and scene numbers and other information for those scenes which match the search criteria. During block 380, access to the database is closed. Processing continues at the user's workstation, during which the database access window for the user is closed. During block 384, processing returns to the WORK SELECTION routine (FIG. 5) at block 330. At this time, the user can choose any one of the retrieved scene databases for performing further processing.

e) ACCESS ARBITRATION Routine (FIGS. 8a and 8b)

Referring to FIGS. 8a and 8b, a more detailed discussion of the ACCESS ARBITRATION routine referenced during the USER INTERACTION routine (FIG. 4) at block 304 is now presented. The ACCESS ARBITRATION routine (FIG. 8a and 8b) verifies whether the user can be granted access to the scene database by evaluating the permission levels associated with the user and the scene database. Earlier, the permission levels were stated to be:

1) read-write status,
2) read-only status, and
3) limited read-write status. (See Section III.)

Processing begins at the user's workstation at block 383, during which the permission level of the user is determined according to the operation the user wishes to perform. During block 385, the requested scene database along with the user's permission level are sent over the first global area network to the Animation Logistics System 23 and, during block 386, the user's credentials are received by the Animation Logistics System 23. At block 388, a determination (at the Animation Logistics System 23) is made on whether the user's credentials are valid. If the user has invalid credentials, during block 390 an "invalid" message is returned over the first global area network 4. The "invalid" message is received by the requesting workstation at block 428 (FIG. 8b). Assuming that the user's credentials are valid, processing continues at block 392.

During block 392, the Production Management Database is searched to determine whether the requested scene is stored in a row of the database. Assuming that scene is stored on the Production Management Database, the File Tracking Database is searched to determine if the requested scene database files are stored in one or more of the disk clusters 28, 30, 32, 34 or 35. Assuming that the requested scene database is not at any of the disk clusters 28, 30, 32, 34 or 35, then processing continues at block 394. During block 394, a search of the Archival Production Management Database is performed to determine if the requested scene database has been archived. If the scene database has not been archived, then during block 396 an "unknown" message is returned to the workstation at block 428 (FIG. 8b). Assuming that the scene database has been archived, then during block 398 an "archived" message is returned to the workstation at block 428 (FIG. 8b). Assuming that the user receives the "archived" message, the user can then separately initiate the ARCHIVAL STORAGE MANAGEMENT routine (FIG. 17) (see Section IV(n)) to move the desired scene database file from the particular archival media (tape drive 19 or optical disk 17) to the local disk cluster 28, 30, 32, 34 or 35 associated with the user's workstation 44-76. A more detailed discussion regarding the ARCHIVAL STORAGE MANAGEMENT routine (FIG. 17) will be discussed infra.

Returning to block 392 (FIG. 8a), assuming that the scene database file is stored in one of the disk clusters 28, 30, 32, 34 or 35, processing continues to block 400. During block 400, Animation Logistics System 23 determines if the user's permission level is "read-only status." The Animation Logistics System 23 determines the status of the requested scene database file by referring to the "lock" status of the scene database entry in the Production Management Database. Assuming that the permission level requested is read-only status, processing continues to block 402 during which a "granted" message is returned to the workstation at block 428 (FIG. 8b). However, if the permission level is not read-only status, then processing continues at block 403. During block 403, the Animation Logistics System 23 determines whether the scene database file is "locked" due to another user having access to the scene database file with read-write status. Recall that if a scene database file is "locked," the database cannot be changed by any user other than the read-write user who currently has access to it; nothing may be added or deleted from the scene database file. Therefore, if the scene database file is presently being accessed by someone who has read-write status, processing continues at block 404 during which a "not available" message is returned to the requesting workstation at block 428 (FIG. 8b). If the scene database file is not presently locked, then processing continues at block 410 (FIG. 8b).

During block 410, a determination of whether the scene database file is currently being accessed by another user under "limited read-write" status is made. If the scene database file is currently locked under the limited read-write status, processing continues at block 412 during which a determination on whether the requesting user has limited read-write status is made. Assuming that the requesting user does not have limited read-write status, then during block 414 a "not available" message is returned to the user's workstation at block 420. However, if the requesting user has limited read-write status, then processing continues at block 416. During block 416, a determination is made on whether the user wishes to access portions of the scene database file which are already accessed by another limited read-write user. Assuming that the user wishes to access portions of the scene database which are already accessed by current limited read-write users, then during block 418 a message "not available" is returned to the user's workstation at block 428. Information on which users currently have access is also provided. Assuming that the user receives access permission to the scene database file, then during block 420 a "limited read-write granted" message is returned and received by the user's workstation at block 428.

Returning to block 410, assuming that the scene database file is not locked under limited read-write status, processing continues at block 422. During block 422, a determination on whether the requesting user has read-write status is made. If the user does not have read-write status, then during block 424 a "bad request" message is returned to the requesting workstation at block 428. A "bad request" message occurs because the user has limited read-write status, however, the scene database does not have limited read-write status. There is an inconsistency in the way the scene database is set up and in the permission level of the user. The only way a user with limited read-write status can obtain a scene database file is if the scene database is also set up with limited read-write status. The scene database was not previously "locked" into limited read-write status by the supervisor to enable the user with the same status to obtain the file. The "bad request" message will inform the user to take appropriate actions to have the file locked properly.

Figure 9:
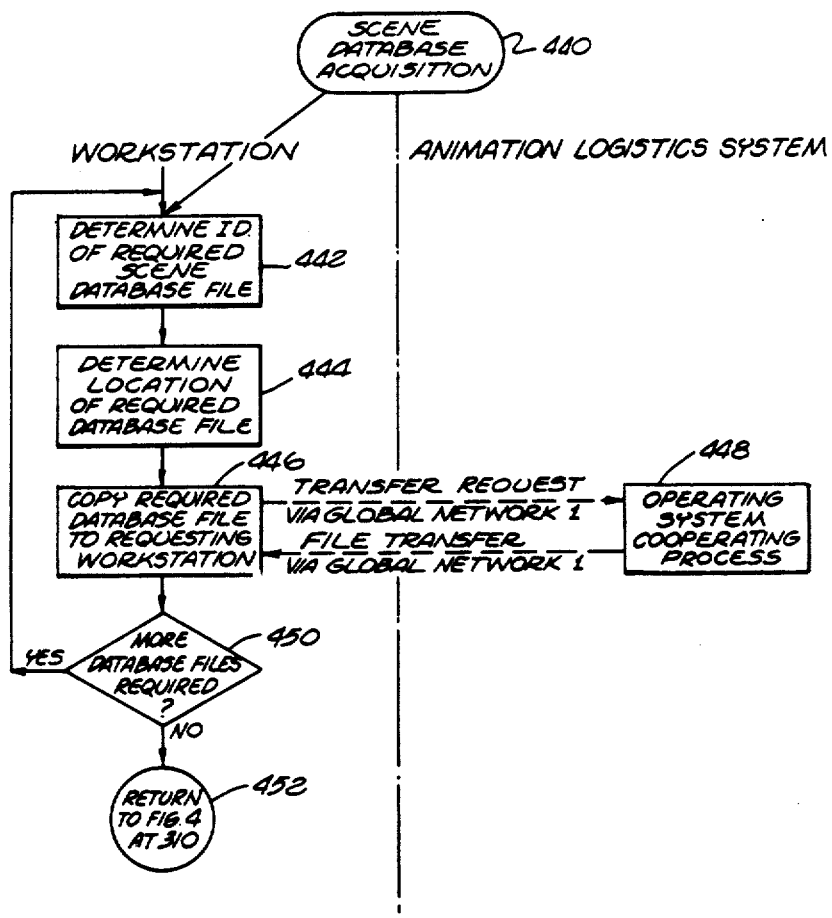
FIG. 9 is a flow diagram which depicts the sequence of operations of a workstation (FIG. 3) and the Animation Logistics System for acquiring a copy of a scene database file under control of the SCENE DATABASE ACQUISITION routine referenced in FIG. 4.

Returning to block 422, assuming that the user has read-write status, processing continues at block 426 during which a "read-write-granted" message is returned to the requesting workstation at block 428. Processing returns at block 438 to the USER INTERACTION routine (FIG. 4) at block 306.

f) SCENE DATABASE ACQUISITION Routine (FIG. 9)

Referring to FIG. 9, a detailed discussion of the SCENE DATABASE ACQUISITION routine (FIG. 9) referenced during the USER INTERACTION routine (FIG. 4) at block 308 is now presented. During block 442, the identification (production, sequence and scene numbers) for the requested scene database files is determined. Earlier, identification was obtained during the WORK SELECTION routine (FIG. 5) discussed earlier in Section IV(b). Then, during block 444, the location of the requested scene database files are determined by referencing the directory associated with the scene on disk drive 21. During block 446, the requested scene database files are transferred from disk drive 21 to the local disk drive 140 . . . 174 associated with the requesting workstation 44-76. This step involves the step of transferring the requested scene database from the Animation Logistics System 23 to the local disk cluster 28, 30, 32, 34 or 35 associated with the requesting workstation 44-76 over the global area network during block 448. Then during block 450, a determination of whether any more scene database files are required is made. If more scene database files are necessary, then processing continues at blocks 442, 444, 446, 448 and 450 until all of the required scene database files have been retrieved. Assuming that no more scene databases need to be accessed, then processing returns during block 452 to the USER INTERACTION routine (FIG. 4) at block 310.

g) IMAGE DATA ACQUISITION Routine (FIG. 10)

Referring to FIG. 10, a detailed description of the IMAGE DATA ACQUISITION routine referenced during the USER INTERACTION routine (FIG. 4) at block 310 is now presented. The purpose of this routine is for determining location and acquiring image data files associated with the scene database files. During block 456, identification for the image data files associated with the selected scene database file are determined. Then, during block 458, the routine ACQUIRE FILE FROM LOCAL DISK CLUSTER (FIG. 11) (see Section IV(h)) is called. This routine checks the local disk cluster 28, 30, 32, 34 or 35 associated with the workstation 44-76 to determine if the image data file requested resides there. The IMAGE DATA ACQUISITION routine checks the local disk cluster first because in the majority of circumstances the requested image data file will have been previously saved on the local disk cluster in anticipation of the workstation's request. For a more detailed discussion, see Section III.

During block 460, a determination of whether the image data file was found is made. Assuming that the image data file cannot be found on the local disk cluster, then processing continues at block 462. During block 462, the ACQUIRE FILE FROM REMOTE DISK CLUSTER routine (FIGS. 12a, 12b and 12c) (see Section IV(f)) is called to search the remaining disk clusters for the requested image data file. At block 464, a determination is made on whether the requested image data file had been found. Assuming that the image data file cannot be found on the remote disk clusters, then during block 466 a system error is returned to the user indicating that the requested image data file is not presently on any of the disk clusters 28, 30, 32, 34 or 35. The requested image data file may reside on one of the archival storage devices. If the file does not exist on the archival storage, then it probably never existed. The ARCHIVAL STORAGE MANAGEMENT routine (FIG. 17) may be separately initiated by the user to retrieve the image data file from archival storage (see Section IV(n)).

However, assuming that the image disk file is found at block 464, processing continues at block 468. Returning briefly to block 460, if the image data was found, then processing would also continue at block 468. In either case, during block 468, a determination is made on whether additional image data files need to be located and retrieved. Assuming that additional image data files are needed, then processing continues at blocks 456, 458, 460, 462, 464, 466 and 468 until all of the required image data files are obtained. This scenario may occur, for example, when the user requests a "test" performance of the images associated with a particular scene database file. According to the exposure sheets and the binding list, the appropriate image data files will be obtained to assemble an entire scene. After all of the image data files have been obtained, additional processing will be required to combine the image data in the appropriate fashion called for by the exposure sheet. Assuming that all of the necessary image data files have been obtained, processing continues at block 470 during which processing returns to the USER INTERACTION routine (FIG. 4) at block 12.

h) ACQUIRE IMAGE FILE FROM LOCAL DISK CLUSTER Routine (FIG. 11a)

Referring to FIG. 11, a detailed description of the ACQUIRE IMAGE FILE FROM LOCAL DISK CLUSTER routine which was referenced during the IMAGE DATA ACQUISITION routine (FIG. 10) at block 426 is now presented. Each workstation attached to a local disk cluster has a private directory associated with at least one of four separate partitions or volumes of the cluster. In the preferred embodiment, the disk clusters 28, 30, 32, 34 or 35 contain four partitions, however, the disk clusters can be partitioned as many times as logically feasible. At block 474, the workstation will identify the disk cluster volume associated with the workstation to begin searching. Each volume contains the following subdirectory of information for each file:
1) file name,
2) file location,
3) file length,
4) file modify time,
5) entry user identification #, and
6) entry type.

During block 476, the workstation will search the volume directory for the requested digital image data file. Then, during block 478, a determination is made on whether the requested digital image data file has been found. As stated earlier, preferably the requested image data file will have been previously stored at the local disk cluster to expedite searching. However, assuming that the digital image data file is not listed on the currently searched volume directory then processing will continue at block 480. At block 480, a determination on whether another volume should be searched is made. Assuming there are four volumes associated with each cluster, up to three more volumes need to be searched. Processing continues to blocks 474, 476, 478, and 480 until the requested digital image file is found or until all of the volume directories have been searched. Assuming that all of the volume directories have been searched, processing continues at block 484. During block 484, an encoded result "not found" is returned to the IMAGE DATA ACQUISITION routine (FIG. 10) at block 460.

Figure 12B:
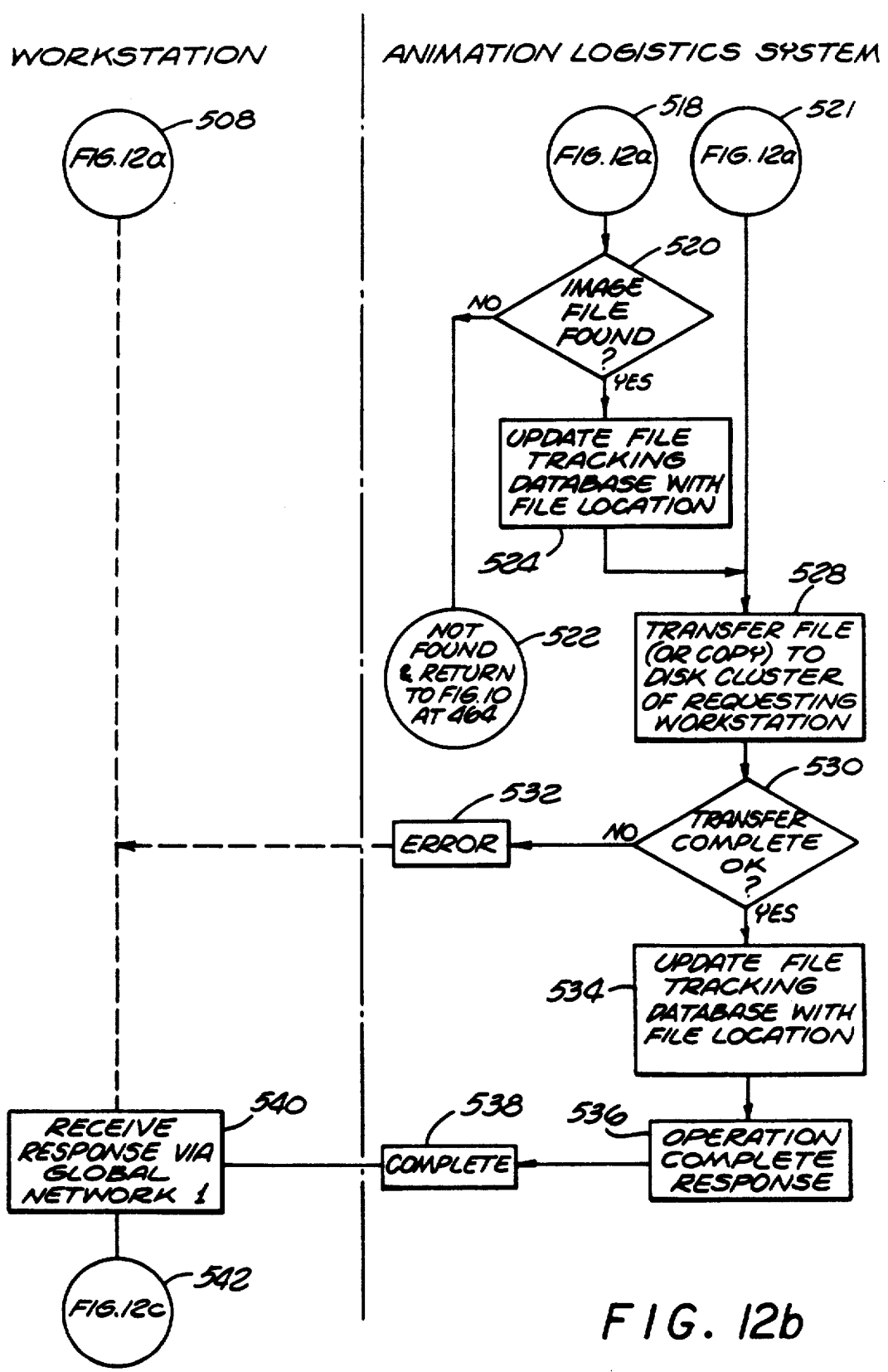
Figure 12C:
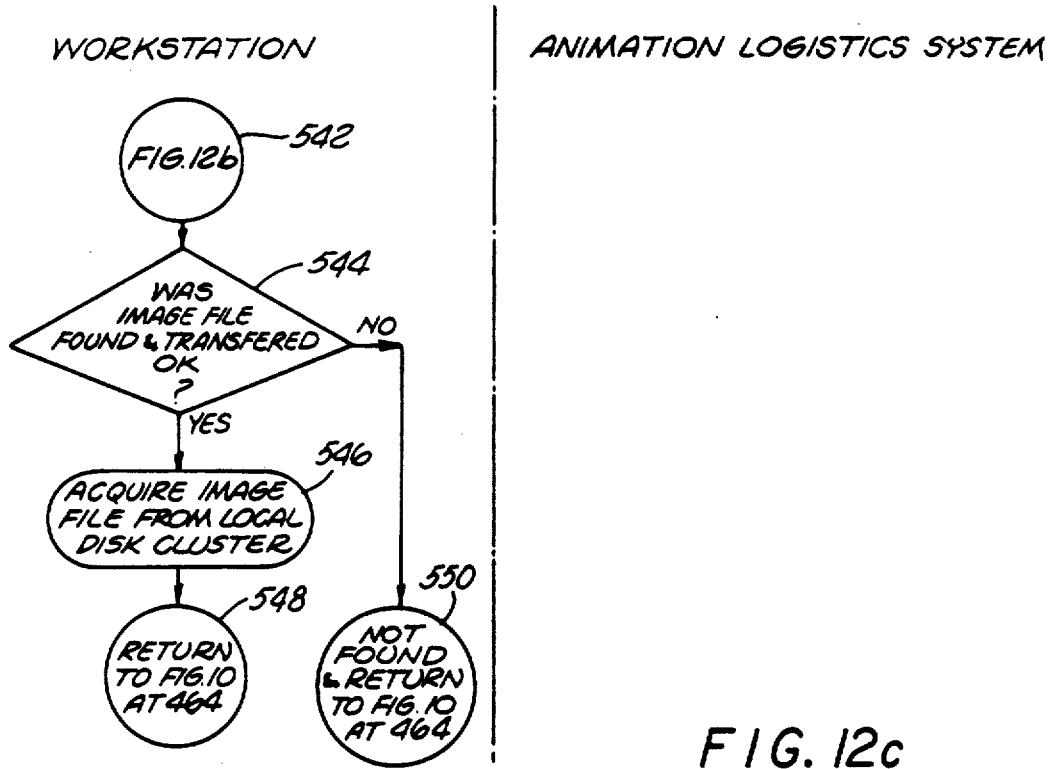

Returning to block 478 (FIG. 11), assuming that the requested image data file has been found, processing continues at block 482. During block 482, a copy of the requested image data file is transferred from the local disk cluster to the requesting workstation. At block 486, a "found" message is returned to the IMAGE DATA ACQUISITION routine (FIG. 10) at block 460.

i) ACQUIRE IMAGE DATA FILE FROM REMOTE DISK CLUSTER Routine (FIGS. 12a, 12b and 12c)

In situations where ACQUIRE IMAGE FILE FROM LOCAL DISK CLUSTER routine (FIG. 11) is unsuccessful, the ACQUIRE IMAGE FILE FROM REMOTE DISK CLUSTER routine (FIGS. 12a, 12b and 12c) is called to retrieve the requested image data file from a remote cluster location 28, 30, 32, 34 or 35 and deliver it to the local cluster associated with the requesting workstation 44-76. At block 500, the requesting workstation initiates the formal request for acquiring the specified image data file as well as other information including the user and workstation identification. The request is sent over the first global area network 4 to the Animation Logistics System 23 and is received at block 502. During block 504, the Animation Logistics System 23 determines if the credentials of the user's and workstation's identification are valid. If the credentials are invalid, then an "invalid" message is returned and received by the requesting workstation at 540 (FIG. 12b). Assuming that the requestor's identification is valid, then processing continues at block 508.

At block 508, the Animation Logistics System 23 searches the File Tracking Database for the location (cluster and volume identification) of the requested image data file. During block 510, a determination is made on whether the requested image file location has been found. Assuming that the location has not been found, processing continues at block 516 during which the SEARCH EACH DISK CLUSTER DIRECTORY routine (FIG. 13) (see Section IV(j)) is called. Typically, the requested image data file will be indexed by the File Tracking Database. However, if a malfunction occurred, for example, and the File Tracking Database did not have up-to-date records regarding the location (cluster and volume numbers) for the requested image data file, then a search would have to be made on each of the volume directories on each of the clusters individually to insure that the image data file was not been overlooked. Due to the processing time required to search each volume directory on each cluster, this procedure is avoided where possible. After the SEARCH EACH DISK CLUSTER DIRECTORY routine (FIG. 13) is performed, processing continues to block 518 and then to block 520 (FIG. 12b). At block 520, a determination on whether the image data file has been found is made. Assuming that the image data file has not been found, then at block 522 "not found" is returned to the IMAGE DATA ACQUISITION routine (FIG. 10) at block 464. However, assuming that the digital image data has been found, at block 524 the File Tracking Database is updated with the current file location (cluster and volume identification) of the requested image file. Processing continues at block 528 which will be discussed shortly.

Returning now to block 510 (FIG. 12a), assuming that the image data file location has been found on the File Tracking Database, processing continues to block 512 during which the Animation Logistics System 23 verifies that the image file actually exists at the location specified by the File Tracking Database. This procedure is provided as a safeguard for insuring that the File Tracking Database is currently up-to-date. At block 514 a determination on whether the requested image data file exists at the specified location is made. Assuming that the requested image data file does not exist at the specified location, processing continues at block 516, during which the SEARCH EACH DISK CLUSTER DIRECTORY routine (FIG. 13) is called (as discussed above). However, assuming that the requested image data file does exist at the specified location, processing continues to block 521 and then to block 528 (FIG. 12b).

Figure 13:
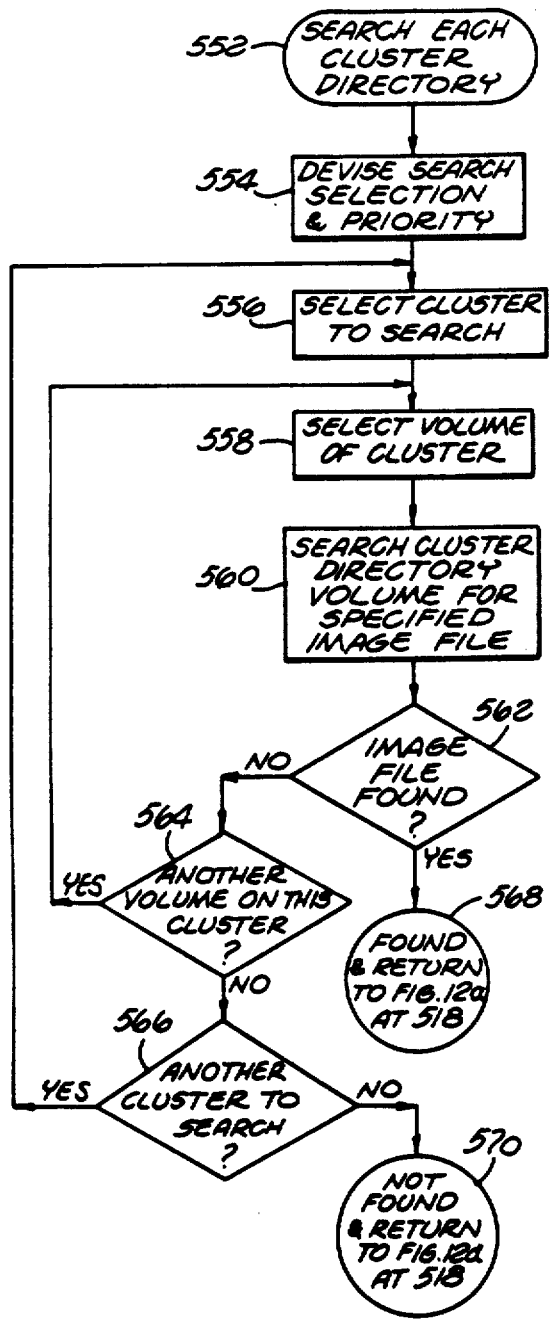

Regardless of the path taken to block 528 (either from block 524 or block 522), a copy of the requested image data file will be made if the image data file is presently being accessed, or the image data file will be moved entirely to the local cluster associated with the requesting workstation if no workstation is currently working with the image data file. This process reduces unnecessary image file duplication and provides a natural migration of the image data files to clusters where they are needed. During block 530, a determination on whether the transfer is complete is determined. If the transfer is not complete, then an "error" message is returned to and received by the workstation at block 540. However, assuming the transfer is complete, then processing continues at block 534. Assuming that the file is moved in its entirety, without making a copy of the file, then the File Tracking Database will be updated with the new location (cluster and volume numbers) of the image data file. At block 536 and block 538, the Animation Logistics System 23 returns a "complete" message to the requesting workstation over the first global area network. Processing continues at block 542 and to block 544 (FIG. 12c). At block 544, the workstation determines whether the file has been located and transferred. If, for some reason, the file has not been both located and transferred, processing will continue at block 550 during which a "not found" message is returned to the IMAGE DATA ACQUISITION routine (FIG. 10) at block 464. However, assuming that the image data file has been found and transferred, then processing continues at block 546, during which the ACQUIRE IMAGE FILE FROM LOCAL DISK CLUSTER routine (FIG. 11) (see Section IV(h)) is called to obtain the image data file from the local cluster. Processing continues at block 540 during which processing returns to the IMAGE DATA ACQUISITION routine (FIG. 10) at block 464.

j) SEARCH EACH CLUSTER VOLUME DIRECTORY Routine (FIG. 13)

FIG. 13 is a flow diagram of the SEARCH EACH CLUSTER VOLUME DIRECTORY routine which was referenced during the ACQUIRE IMAGE FILE FROM REMOTE DISK CLUSTER routine (FIGS. 12a, 12b and 12c) at block 516. At block 554, a search scenario is selected. More particularly, because a search of the volume directories associated with the local disk cluster were previously performed by the ACQUIRE IMAGE FILE FROM LOCAL DISK CLUSTER routine (FIG. 11), there is no reason to search these directories again. Therefore, the search will be devised so that only the volume directories for the remaining clusters will be searched. Processing continues at block 556, during which the first disk cluster directory to be searched is selected. Then at block 554 one of the four volumes of the selected disk cluster is chosen. At block 60, a search is performed on the cluster volume directory for the requested image data file. During block 562 a determination on whether the digital image data file is located on the current cluster volume directory is made. Assuming that the digital image data file is not located on the present cluster volume directory, then processing continues at block 564.

During block 564, another volume directory is chosen from the current cluster. Processing continues at blocks 558, 560, 562 and 564 until the requested image data file is found or until all of the volume directories of the current cluster have been searched. If the requested digital image data file is found on one of the volume directories of the current cluster, processing continues from block 562 to block 568. During block 568 a message "found" is returned to the ACQUIRE IMAGE FILE FROM REMOTE DISK CLUSTER routine (FIGS. 12a, 12b and 12c) at block 518. However, assuming that the requested digital image data file has not been found on any of the volume directories of the current cluster, then processing will continue from block 564 to block 566, during which a determination is made on whether any other disk cluster 28, 30, 32, 34 or 35 of the computer animation production system 2 should be searched.

Figure 14:
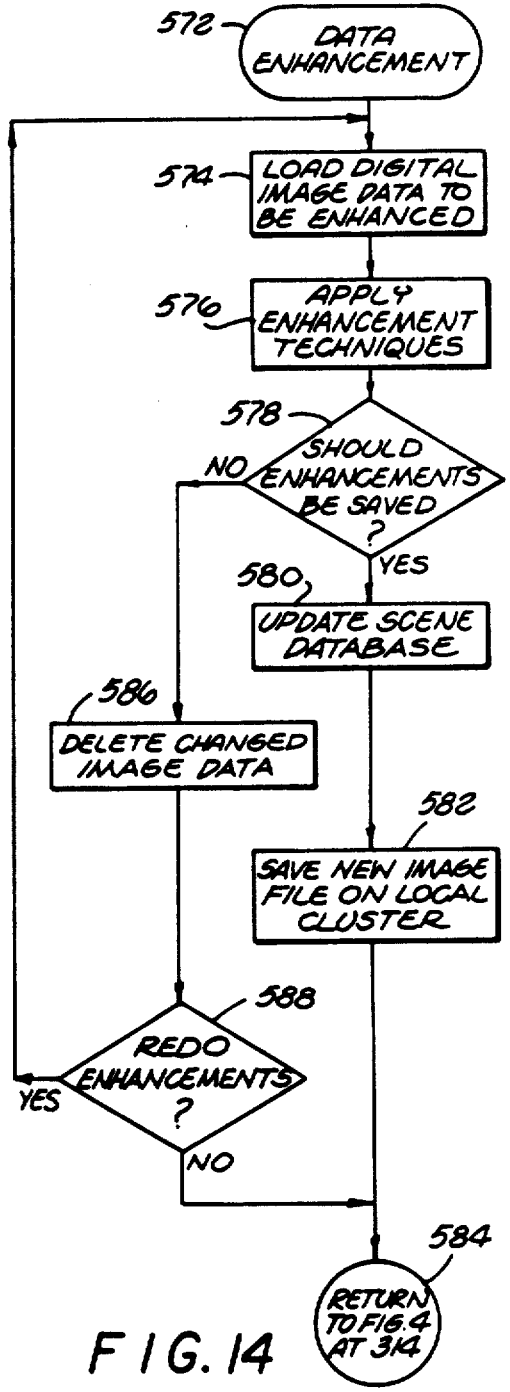
FIG. 14 is a flow diagram which depicts the sequence of operations of a workstation (FIG. 3) and its associated memory for enhancing digital image data under control of the DATA ENHANCEMENT routine referenced in FIG. 4.

Assuming that there are still other disk clusters that have not been searched, processing continues at blocks 556, 558, 560, 562, 564, 566 until the requested image data file is found or until all of the volume directories of each of the clusters 28, 30, 32, 34 or 35 have been searched. Assuming that all of the disk clusters 28, 30, 32, 34 or 35 have been searched and the image data file is not found, processing continues at block 570, during which a "not found" message is returned to the ACQUIRE IMAGE FILE FROM REMOTE DISK CLUSTER routine (FIGS. 12a, 12b and 12c) at block 518. Eventually, the "not found" message works its way back to the IMAGE DATA ACQUISITION routine (FIG. 10) at block 468 where a system error is returned to the user as discussed earlier in Section IV(g). The system error indicates that the digital image data file is not present on any one of the disk clusters. The user of the system will be alerted of the system error and may retrieve the digital image data file from archival storage by initiating the ARCHIVAL STORAGE MANAGEMENT routine (FIG. 17) (see Section IV(n)), assuming that the file actually exists.

k) DATA ENHANCEMENT Routine (FIG. 14)

FIG. 14 is a flow diagram of the DATA ENHANCEMENT routine referenced during the USER INTERACTION routine (FIG. 4) at block 312. At block 574 the digital image data to be enhanced is loaded into the image processor 76 (FIG. 3) of the workstation 44 (FIG. 3). Then, during block 576, any one of the various capabilities of the workstation is initiated including cell coloring, image compositing, color modeling, scene planning, layout design or background painting (see Section II). Then, during block 578, a determination on whether the enhancements should be saved is made. Enhancements would be saved in a disk file space in the cluster volume currently not previously allocated to the user. Assuming that the enhancements are not going to be saved, then processing continues at block 586. At block 586, the image data which has been enhanced is deleted. At block 558, a determination is made on whether the user would like to redo any of the enhancements on the same image data file. Assuming that the user wishes to start over again and enhance the same image data file, processing continues at blocks 574, 576, 578, 586 and 588 until the user decides to save the enhancements or exit the routine. Assuming that the user wishes to exit the routine, processing continues from block 588 to block 584. During block 584, processing returns to the USER INTERACTION routine (FIG. 4) at block 314.

Figure 15A:
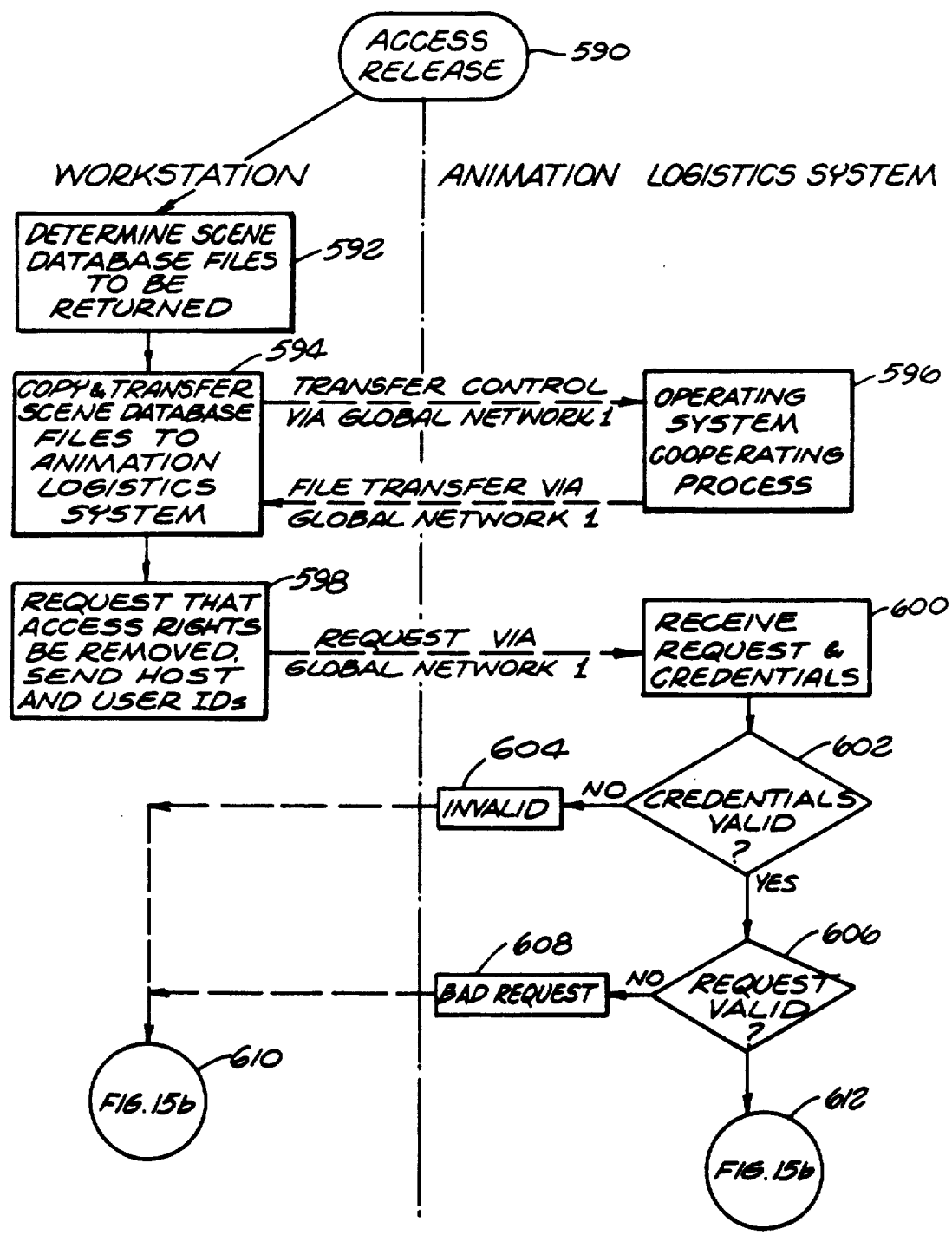
Figure 15C:
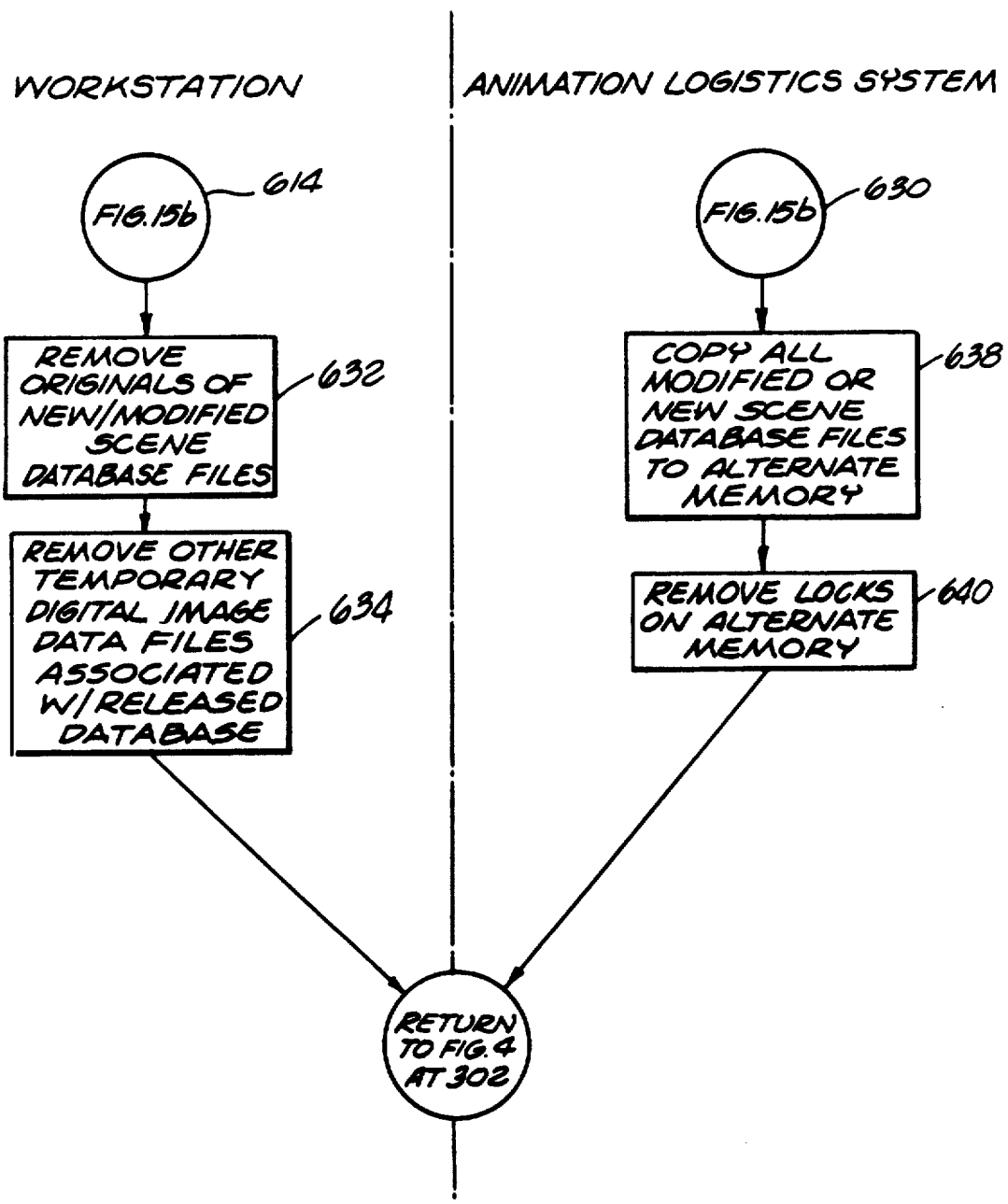

Returning to block 578, assuming that the user decides that the enhancements should be saved, processing continues at block 580. During block 580, the scene database files are updated to reflect the current status of the scene. At block 582, the new version of the image data file is saved on the local disk cluster and at block 584, processing returns to the USER INTERACTION routine (FIG. 4) at block 314.

l) ACCESS RELEASE Routine (FIGS. 15a, 15b and 15c)

FIGS. 15a, 15b and 15c depict a flow diagram of the ACCESS RELEASE routine referenced during the USER INTERACTION routine (FIG. 4) at block 316. This routine assures that scene database files and image database files are not improperly saved or improperly deleted.

At block 592, the user determines which scene database files and their associated image data files need to be returned. Then, during block 594, a copy of the scene database files are transferred to the Animation Logistics System 23 (more particularly, to disk drive 21) which is coordinated by the operating system of the computer animation production system 2 at block 596. Then, during block 598, the workstation requests that the access rights to the scene database files be removed. The host's and user's identification along with the release access request are sent over the first global area network 4 to the Animation Logistics System 23 and received by it at block 600. During block 602 the identification credentials are checked. If the credentials are invalid, then an "invalid" message at block 604 is returned to the workstation via the first global area network 4. However, assuming that the credentials are valid, processing continues at block 606. During block 606, a determination on whether the request is valid is made. This step is performed to ensure that the requested release properly operates on valid files. For example, if the scene-database files are being returned by a user who does not exist, then a "bad request" message is returned at block 608. However, assuming that the request is valid, processing continues at block 612 and then to block 616 (FIG. 15b).

During block 616, a complete list of the scene database files to be returned is tabulated. Processing continues at block 618 during which the RETURN SCENE DATABASE FILE routine (FIG. 16) (see Section IV(m)) is called to evaluate the permission level of the user and to return one scene database file at a time according to the permission level (i.e. read-write, read-only, limited read-write) of the user. Depending on the permission level status of the user, the returned scene database file will either be deleted, saved or saved in part. Processing continues at block 620, during which a determination on whether any more scene database files need to be processed is made. Assuming that there are more scene database files to be returned, then processing continues at blocks 618 and 620 until all of the specified scene database files are returned. Assuming that no more scene database files need to be returned, then processing continues at block 622. During block 622, the entries corresponding to the returned scene database files on Production Management Database are updated by removing all locks on the returned scene database files. Processing continues at block 626 during which an encoded result "success" is formulated and is sent to the workstation by the first global area network 4 at block 628. After the return operation has been completed and the "done" message is sent to the workstation, processing occurs concurrently at both the workstation and the Animation Logistics System 23 as shown by FIG. 15c.

Referring to block 632 (FIG. 15c), the workstation removes all of the original copies of the scene database files currently stored on the local disk 140-174. Earlier, copies of the scene database files were made and sent at block 594 to the Animation Logistics System 23. Now that the scene database files have been returned, there is no reason to continue to retain additional copies of the files at the local disk 140-174. Additionally, at block 634, all image data files associated with the released scene database files which were created or enhanced under read-only status are deleted from the local cluster. The read-only image data files are only copies of the original file which do not have to be saved. At block 636 processing returns to the USER INTERACTION routine (FIG. 4) at block 302.

Concurrent with the operations performed by blocks 632 and 634, the Animation Logistics System 23 at blocks 638 and 640 performs a series of backup operations. Specifically, at block 638, a copy of the modified scene database files are stored in an alternate memory area (no shown). Additionally, at block 640, any locks that may have been associated with the scene database are removed from the corresponding entry of the Production Management Database in the alternate memory. At block 636, processing also returns to the USER INTERACTION routine (FIG. 4) at block 302.

m) RETURN SCENE DATABASE FILE Routine (FIG. 16)

FIG. 16 is a flow diagram of the RETURN SCENE DATABASE FILE routine referenced during the ACCESS RELEASE routine (FIGS. 15a, 15b and 15c) at block 618. During block 646, a determination of the permission level associated with the user is made. Assuming that the user has a permission level status of "read-write", processing continues to block 648 During block 648, the original scene database file is replaced with the new and modified scene database file returned during block 594 of the ACCESS RELEASE routine (FIGS. 15a, 15b and 15c). Then, during block 649, the File Tracking Database is updated with the new cluster and volume locations of the modified image data files associated with the returned scene database files.

Returning to block 646, if the permission level status of a user is "read-only", the file returned during block 594 of the ACCESS RELEASE routine (FIG. 15a, 15b and 15c) will be deleted during block 650. Recall that any user may request files on a "read-only" permission level in order to perform test composites, look at frames, or other operations that will not affect the content of the production file. Once the read-only scene database file copies are returned, there is no reason to store them and, therefore, they are deleted. Lastly, if the permission level of the user is determined to be limited read-write at block 646, then during block 652 the additional or updated portions of the modified scene database file will be appended or updated to the original scene database file. Processing will continue at block 653, during which the File Tracking Database is updated with the cluster and volume locations of the modified image data files associated with the returned scene database files. Regardless of the permission level status of the user, processing will continue from blocks 649, 650 or 653 to block 654, during which processing returns to the ACCESS RELEASE routine (FIGS. 15a, 15b and 15c) at block 620.

n) ARCHIVAL STORAGE MANAGEMENT Routine (FIG. 17)

FIG. 17 is a flow diagram of the ARCHIVAL STORAGE MANAGEMENT routine which may be initiated by the user of a workstation during the ACCESS ARBITRATION routine (FIGS. 8a, 8b and 8c) (see Section IV(e)). At block 658, a determination is made on whether a requested segment of data (including one or more files or a scene (many files)) has been requested from archival storage or whether the segment of data will be stored to archival storage. Assuming that a request for the segment of data has been initiated, processing continues at block 660. During block 660, the location of the requested segment of data is determined by referencing the Archival Production Management database. During block 662, the archival medium type and the storage media identification are determined. Assuming that the requested segment of data is stored on optical disk 17, processing continues at block 664 to obtain the requested segment of data from optical disk 17. However, if the data segment is stored on high capacity tape drive 19, then processing continues at block 666, during which the requested segment of data is obtained from tape drive 19. Regardless of which archival medium (17 or 19) the requested segment of data is stored on, processing will continue at block 668 during which the Production Management Database is updated with the requested data information. Then, at block 669, the requested segment of data is transferred over the second global area network to the local disk cluster of the requesting workstation. The associated parallel disk controller 36, 38, 40, 42 or 43 will attempt to place the new segment of data in the cluster associated with the requesting workstation. If there is insufficient free space available to retain all of the new files in the reserved portion, then another portion of the cluster may be used to handle the overflow by creating an addendum to the private directory associated with the requesting workstation. In either case, the directory associated with the workstation must be updated to reflect the new files stored there. Additionally, the File Tracking Database maintained by the Animation Logistics System 23 is also updated to reflect the cluster and volume locations associated with the new data segment. Processing returns to the calling program at block 670.

Returning to block 658, if a segment of data has not been requested, then processing continues at block 672. An assumption is made that the ARCHIVAL STORAGE MANAGEMENT routine (FIG. 17) has been called to store a file in archival storage. During block 672 a determination is made on whether the data segment is being stored for a long term or short term. Assuming that long term archival storage is required, processing continues at block 674 during which the data segment is stored on optical disk 17. Long term storage for optical disks may last up to approximately 100 years, which is more than an adequate time frame for storing the file. Processing continues at block 676 during which the Archival Production Management Database is updated with the new archival file locations of the data segment information. Then during block 677, the stored data segment entries are deleted from the File Tracking Database to indicate that the stored file no longer exists on any cluster. At block 670, processing returns to the calling program.

Returning to block 672, if the data segment needs to be stored for a relatively short term (less than 10 years), then processing continues at block 680 during which the data segment is stored on high capacity tape drive 19. A typical scenario requiring short term storage involves situations where a particular scene is not ready for further enhancements. The artwork is stored on tape 19 to free up space on the disk clusters. Processing continues at block 682 during which the Archival Production Management Database is updated to reflect the new file locations for the data segment. Then during block 683, the stored file entries of the data segment are deleted from the File Tracking Database to indicate that the stored file no longer exists on any cluster. Processing returns to the calling program at block 670.

This invention has been described in an exemplary and preferred embodiment, but is not limited thereto. Those skilled in the art will recognize that a number of additional modifications and improvements can be made to the invention without departure from the essential spirit and scope. For example, a number of software and hardware design methodologies and architectures in any number of different software languages will be suitable for implementing the disclosed invention.

What is claimed is:

1. A method for use with a computer image production system for efficiently processing digital image data including pixel characteristic information, said computer image production system comprising a logistics system for storing said digital image data and control information relating to said digital image data, one or more information processing devices for enabling at least one user to develop, utilize, and enhance said digital image data, a first network for coupling each of said one or more information processing devices to said logistics system for communicating said control information to and from said logistics system to and from said one or more information processing devices, one or more first arbitration means for arbitrating access of said digital image data among said one or more information processing devices, one or more of said one or more information processing devices coupled to one of said first arbitration means, one or more temporary memory means, each of said temporary memory means coupled to one of said one or more first arbitration means, each of said temporary memory means for storing said digital image data likely to be accessed by said coupled one or more information processing devices, and a second network having one or more high-speed data buses, each of said high-speed data buses for coupling said logistics system to said first arbitration means and for communicating said digital image data to and from said first arbitration means to and from said logistics system, said digital image data for image display on at least one of said information processing devices, said method comprising the steps of:

sending a first request from one of said information processing devices to said first arbitration means coupled to said requesting information processing device for a segment of said digital image data for further processing;

if said requested segment of digital image data is located at said temporary memory means coupled to said first arbitration means coupled to said requesting information processing device, transferring said requested segment of digital image data from said temporary memory means through said first arbitration means to said requesting information processing device;

if not, sending a second request from said requesting information processing device over said first network to said logistics system, determining by said logistics system wherein said computer image production system said segment of digital image data is located, transferring over said second network said requested segment of digital image data through said first arbitration means coupled to said requesting information processing device to said temporary means coupled to said first arbitration means from said logistic system or from one of said temporary means which is coupled to one of said first arbitration means that is not coupled to said requesting information processing device; and transferring said requested segment of digital image data from said temporary memory means through said first arbitration means coupled to said temporary means to said requesting information processing device and processing said requested element of digital image data by said requesting information processing device.

2. The method of claim 1 wherein said step of transferring said requested segment of digital image data further includes the step of transferring an identical representation of said requested segment of digital image data from said temporary memory means containing said requested segment of digital image data to said temporary memory means coupled to said first arbitration means coupled to said requesting information processing device.

3. The method of claim 1 wherein said step for determining the location in said computer image production system of said requested segment of digital image data further includes the step of referencing said control information maintained by said logistics system to determine if any of said not coupled temporary memory means contains said requested segment of digital image data.

4. The method of claim 3 further including the step of transferring over said second network an identical representation of said requested segment of digital image data from said not coupled temporary memory means containing said requested segment of digital image data to said temporary memory means coupled to said first arbitration means coupled to said requesting information processing device.

5. The method of claim 4 wherein said logistics system further includes archival memory means for storing said digital image data for a long period of time, and said step for determining wherein in said computer image production system said requested segment of digital image data is located further includes the step of referencing said control information to determine whether said archival memory means contains said requested segment of digital image data.

6. The method of claim 5 wherein said step of transferring said requested segment of digital image data further comprises the step of transferring over said second network said identical representation of said requested segment of digital image data from said archival memory means to said temporary memory means coupled to said first arbitrating means coupled to said requesting information processing device.

7. The method of claim 6 wherein said step of transferring further comprises the step of transferring said identical representation of said requested segment of digital image data from said temporary memory means containing said requested segment of digital image data to said requesting information processing device.

8. The method of claim 3 or 5 wherein said control information further comprises a worklist database which maintains production workflow information for each of said users associated with each of said information processing devices, said worklist database for providing each of said users work assignments and said method further including the step of providing said work assignments to said users at each of said information processing device.

9. The method of claim 8 wherein said worklist database further comprises a second arbitration means, said second arbitration means for arbitrating access to said production workflow information by said users, said step of requesting further including the step of referencing said second arbitration means to determine permission status for each of said users workflow information and said requested segment of digital image data.

10. The method of claim 9 wherein said second arbitration means further comprises read-only means for allowing said one or more information processing devices to obtain said identical representation of said requested segment of digital image data, said step for requesting further includes the step of disabling one or more of said one or more information processing devices from updating said requested segment of digital image data.

11. The method of claim 9 wherein said second arbitration means further comprises means for allowing only one of said one or more information processing devices to update a said requested segment of digital image data at any one time, said step for requesting further includes the step of enabling only one of said one or more information processing devices to update said requested segment of digital image data.

12. The method of claim 11 further including the step of saving said requested segment of digital image data prior to said step of updating said requested segment of digital image data.

13. The method of claim 11 wherein said second arbitration means further comprises limited read/write means for allowing each of said information processing devices to update an assigned subset of said requested segment of digital image data, said step for requesting further includes the step of enabling one or more of said one or more information processing devices access to said assigned subset of said requested segment of digital image data and enabling said one or more information processing devices to update said assigned subset of said requested segment of digital image data.

14. The method of claim 13 further including the step of saving said requested segment of digital image data prior to said step of updating said requested segment of digital image data.

15. An apparatus for use with a computer image production system for efficiently processing digital image data including pixel characteristic information, said computer image production system comprising a logistics system for storing said digital image data and control information relating to said digital image data, one or more of information processing devices for enabling at least one user to develop, utilize, and enhance said digital image data, a first network for coupling each of said one or more information processing devices to said logistics system for communicating said control information to and from said logistics system to and from said one or more information processing devices, one or more first arbitration means for arbitrating access of said digital image data among said one or more information processing devices, one or more of said one or more information processing devices coupled to one of said one or more first arbitration means, one or more temporary memory means, each of said temporary memory means coupled to one of said one or more first arbitration means, each of said temporary memory means for storing said digital image data likely to be accessed by said one or more information processing devices, and a second network having one or more high-speed data buses, each of high speed data buses for coupling said logistics system said first arbitration means and for communicating said digital image data to and from each of said first arbitration means to and from said logistics system, said digital image data for image display on at least one of said first arbitration means to and from said logistics system, said digital image data for image display on at least one of said plurality of information processing devices, said apparatus comprising:

means for sending a first request from one of said information processing devices to said first arbitration means coupled to said requesting information processing device for a segment of said digital image data for further processing;

means for transferring said requested segment of digital image data from said temporary memory means through said first arbitration means to said requesting information processing device;

means for sending a second request from said requesting information processing device over the first network to said logistics system, means for determining by said logistics system wherein said computer image production system said segment of digital image data is located, means for transferring over said second network said requested segment of digital image data through said first arbitration means coupled to said requesting information processing device to said temporary means coupled to said first arbitration means from either said logistic system or from one of said temporary means which is coupled to one of said first arbitration means that is not coupled to said requesting information processing device; and means for transferring said requested segment of digital image data from said temporary memory means through said first arbitration means coupled to said temporary memory means to said requesting information processing device and for processing said requested segment of digital image data by said requesting information processing device.

16. The apparatus of claim 15 wherein said means for transferring said requested segment of digital image data further includes means for transferring an identical representation of said requested segment of digital image data from said temporary memory means containing said requested segment of digital image data to said temporary memory means coupled to said first arbitration means coupled to said requesting information processing device.

17. The apparatus of claim 15 wherein said means for determining the location in said computer image production system of said requested segment of digital image further includes the means for referencing said control information maintained by said logistics system to determine if any of said not coupled temporary memory means contains said requested segment of digital image.

18. The apparatus of claim 17 further including means for transferring over said second network an identical representation of said requested segment of digital image data from said not coupled temporary memory means containing said requested segment of digital image data to said temporary memory means coupled to said first arbitration means coupled to said requesting information processing device.

19. The apparatus of claim 18 wherein said logistics system further includes archival memory means for storing said digital image data for a long period of time, and said means for determining where in said computer image production system said requested segment of digital image data is located further includes means for referencing said control information to determine whether said archival memory means contains said requested segment of digital image data.

20. The apparatus of claim 19 wherein said second network further comprises means for transferring over said second network said identical representation of said requested segment of digital image data from said archival memory means to said temporary memory means coupled to said first arbitrating means coupled to said requesting information processing device.

21. The apparatus of claim 20 wherein said means for transferring further comprises means for transferring said identical representation of said requested segment of digital image data from said temporary memory means containing said requested segment of digital image data to said requesting information processing device.

22. The apparatus of claim 17 or 19 wherein said control information further comprises a worklist database which maintains production workflow information for each of said users associated with each of said information processing devices, said worklist database for providing each of said users work assignments, and said apparatus further including means for providing said work assignments to at least one of said user at each of said information processing devices.

23. The apparatus of claim 21 wherein said worklist database further comprises a second arbitration means, said second arbitration means for arbitrating access to said production workflow information by said users, and said means for requesting further including means for referencing said second arbitration means to determine permission status for each of said users to update said production workflow information and said requested segment of digital image data.

24. The apparatus of claim 23 wherein said second arbitration means further comprises read-only means for allowing said one or more information processing devices to obtain said identical representation of said requested segment of digital image data, said means for requesting further includes means for disabling one or more of said one or more information processing devices from updating said requested segment of digital image data.

25. The apparatus of claim 23 wherein said second arbitration means further comprises read-write means for allowing only one of said one or more information processing devices to update said requested segment of digital image data, and means for requesting further includes means for enabling only one of said one or more information processing devices to update said requested segment of digital image data.

26. The apparatus of claim 25 further including means for saving said requested segment of digital image data prior to said step of updating said requested segment of digital image data.

27. The apparatus of claim 23 wherein said second arbitration means further comprises limited read/write means for allowing each of said information processing devices to update an assigned subset of said requested segment of digital image data, said means for requesting further includes means for enabling one or more of said one or more information processing devices access to said assigned subset of said requested segment of digital image data and enabling said one or more information processing devices to update said assigned subset of said requested segment of digital image data.

28. The apparatus of claim 27 further including means for saving said requested segment of digital image data prior to said step of updating said requested segment of digital image data.

29. A computer image production system for efficiently processing digital image data including pixel characteristic information for enabling users of said computer image production system to develop, utilize, and enhance said digital image data, said computer image production system comprising:
   a logistics system for storing said digital image data and for maintaining control information relating to said digital image data,
   one or more information processing devices for enabling said users of said computer image production system to review, request and enhance said digital image data and control information,
   a first network for coupling each of said one or more information processing devices to said logistics system for communicating said control information to and from said logistics system to and from said one or more information processing devices,
   one or more first arbitration means for arbitrating access of said digital image data among one or more of said information processing devices, and one or more of said one or more information processing devices coupled to one of said first arbitration means,
   a temporary memory means coupled to each of first arbitration means, said temporary memory means for storing said digital image data likely to be requested by said one or more information processing devices coupled to said first arbitration means, and
a second network having one or more independent high-speed data buses, each of said high-speed data buses coupling said logistics system to one of said first arbitration means and for communicating said digital image data to and from each of said first arbitration means to and from said logistics system.

30. The apparatus of claim 29 wherein said logistics system further comprises archival memory means for storing said digital image data and/or said control information for long periods of time.

31. The apparatus of claim 30 wherein said archival memory means is one or more optical disc configurations for storing said digital image data and/or said control information.

32. The apparatus of claim 30 wherein said archival memory means is one or more high capacity tape drive systems for storing said digital image data and/or said control information.

33. The apparatus of claim 30 wherein said control information further comprises archival production management database means for maintaining archival file location information of said digital image data in said archival memory means.

34. The apparatus of claim 33 wherein said archival production management database means is a relational database for storing said archival file location information.

35. The apparatus of claim 29 wherein said at least one information processing device is a computerized user workstation for enabling at least one user to develop, utilize, and enhance said digital image data and/or said control information.

36. The apparatus of claim 29 wherein said control information further comprises production management database means for maintaining production information needed to generate production management reports.

37. The apparatus of claim 36 wherein said production management database means is a portion of a relational database for storing said production information.

38. The apparatus of claim 29 wherein said control information further comprises file tracking database means for maintaining file location information of said digital image data at said temporary memory means.

39. The apparatus of claim 38 wherein said file tracking database means is a portion of a relational database for storing said file location information.

40. The apparatus of claim 29 wherein said control information further comprises worklist database means for maintaining production workflow information of said digital image data and/or said control information.

41. The apparatus of claim 40 wherein said worklist database means is a portion of a relational database for storing said production workflow information.

42. The apparatus of claim 40 wherein said worklist database means further comprises second arbitration means for arbitrating access by said user to said production workflow information when updating said production workflow information and said digital image data.

43. The apparatus of claim 42 wherein said second arbitration means further comprises read-write means for allowing only one of said one or more information processing devices to update a production workflow information file or a corresponding digital image data file at any one time.

44. The apparatus of claim 42 wherein said second arbitration means further comprises read-only means for allowing one or more of said plurality of information processing devices to obtain said identical representation of said digital image data file, said identical representation non-returnable to said temporary memory means or said archival memory means.

45. The apparatus of claim 42 wherein said second arbitration means further comprises limited read-write means for allowing one of said one or more information processing devices to update an assigned portion of said production workflow information file or said corresponding digital image data file.

* * * * *

UNITED STATES PATENT AND TRADEMARK OFFICE
CERTIFICATE OF CORRECTION

PATENT NO. : 5,091,849

DATED : Feb. 25, 1992

INVENTOR(S) : Lemuel L. Davis, et al

It is certified that error appears in the above-identified patent and that said Letters Patent is hereby corrected as shown below:

Col. 1, line 57, after "frames" insert --.--

Col. 3, line 41, after "is" and before "flow" insert --a--

Col. 4, line 43, after "and" insert --image data files under control of the RETURN SCENE--

Col. 8, line 44, cancel "cells" and insert --cell--

Col. 9, line 2, cancel "cells" and insert --cell--

Col. 14, line 11, cancel "cells" and insert --cell--

Col. 21, line 66, cancel "60" and insert --560--

Col. 24, line 30, cancel "no" and insert --not--

Col. 27, line 26, Claim 1, cancel "element" and insert --segment--

Col. 27, line 57, Claim 5, cancel "wherein" and insert --where--

Col. 28, line 36, Claim 11, after "comprises" and before "means" insert --read-write--

Col. 28, line 60, Claim 14, after "said" (second occurrence) and before "requested" insert --subset of said--

Col. 29, line 23, Claim 15, delete "first arbitration means to and from said logistics system, said digital image data for image display on at lease one of said"

Col. 30, line 19, Claim 19, cancel "a long period of time," and insert --long periods of time--

Col. 30, line 49, Claim 23, cancel "21" and insert --22--

UNITED STATES PATENT AND TRADEMARK OFFICE
CERTIFICATE OF CORRECTION

PATENT NO. : 5,091,849

DATED : February 25, 1992

INVENTOR(S) : Lemuel L. Davis, et al

It is certified that error appears in the above-identified patent and that said Letters Patent is hereby corrected as shown below:

Col. 31, line 9, Claim 26, cancel "prior to said step of" and insert --operative prior to said means for--

Col. 31, line 24, Claim 28, cancel "prior to said step of" and insert --operative prior to said means for--

Signed and Sealed this

Thirteenth Day of July, 1993

Attest:

MICHAEL K. KIRK

*Attesting Officer*    Acting Commissioner of Patents and Trademarks